(12) United States Patent
Conner et al.

(10) Patent No.: US 9,643,647 B2
(45) Date of Patent: *May 9, 2017

(54) STEERING KNUCKLE APPARATUS FOR A VEHICLE

(71) Applicants: Hitachi Metals America, Ltd., Novi, MI (US); Hitachi Metals, Ltd., Tokyo (JP)

(72) Inventors: Aaron Conner, Novi, MI (US); Rick Bowen, Novi, MI (US); Ronald Walker, Novi, MI (US); Satoru Shiozawa, Moka (JP)

(73) Assignees: HITACHI METALS AMERICA, LTD., Novi, MI (US); HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,367

(22) Filed: Oct. 6, 2015

(65) Prior Publication Data

US 2016/0090122 A1    Mar. 31, 2016

Related U.S. Application Data

(63) Continuation-in-part of application No. 14/532,564, filed on Nov. 4, 2014, which is a continuation-in-part
(Continued)

(51) Int. Cl.
*B62D 7/18* (2006.01)
*B60G 7/00* (2006.01)

(52) U.S. Cl.
CPC .............. *B62D 7/18* (2013.01); *B60G 7/001* (2013.01); *B60G 2206/50* (2013.01)

(58) Field of Classification Search
CPC  B62D 7/18; B60G 2206/50; B60G 2204/148; B60K 17/303; B60K 17/306
(Continued)

(56) References Cited

U.S. PATENT DOCUMENTS 3,749,415 A    7/1973  Sampatacos
4,618,159 A   10/1986  Kozyra et al.
(Continued)

FOREIGN PATENT DOCUMENTS

IN    2012MU00844       3/2013
JP    2001-114127 A     4/2001
(Continued)

OTHER PUBLICATIONS

United States Notice of Allowance dated Dec. 28, 2015 in co-pending U.S. Appl. No. 29/503,927.
(Continued)

*Primary Examiner* — Keith Frisby
(74) *Attorney, Agent, or Firm* — McGinn IP Law Group, PPLC

(57) ABSTRACT

A vehicle steering knuckle includes a body part to which an axle is attached, an arm portion including one end integrally connected with an outer periphery of the body part and spreading outwardly from the body part along an extending axis, and a connecting portion configured to be connected with a vehicle component. The arm portion includes a first portion, a second portion, and a hollow portion. The first portion including a peripheral wall configured to enclose around the extending axis. The second portion including a peripheral wall including an opening partially opened around the extending axis. At a cross-section intersecting the extending axis, an end portion of the peripheral wall of the second portion on a side of the opening includes an enlarged portion which is enlarged in width as compared with thickness of side portions adjacent to the end portion.

17 Claims, 24 Drawing Sheets

Related U.S. Application Data of application No. 29/503,919, filed on Sep. 30, 2014, now abandoned, and a continuation-in-part of application No. 29/503,927, filed on Sep. 30, 2014, now Pat. No. Des. 755,687, and a continuation-in-part of application No. 29/503,929, filed on Sep. 30, 2014, now abandoned, and a continuation-in-part of application No. 29/503,930, filed on Sep. 30, 2014, now Pat. No. Des. 764,360, and a continuation-in-part of application No. 29/509,931, filed on Sep. 30, 2014, now abandoned, and a continuation-in-part of application No. 29/503,922, filed on Sep. 30, 2014, now Pat. No. Des. 764,359.

(58) Field of Classification Search
USPC .................................................. 280/93.512
See application file for complete search history.

(56) References Cited

U.S. PATENT DOCUMENTS

| | | | |
|---|---|---|---|
| 4,722,540 A | | 2/1988 | Kozyra et al. |
| 5,022,673 A | * | 6/1991 | Sekino ..................... B60G 3/20 |
| | | | 280/124.138 |
| 5,120,150 A | | 6/1992 | Kozyra et al. |
| 5,366,233 A | | 11/1994 | Kozyra et al. |
| 6,179,308 B1 | | 1/2001 | Mielauskas et al. |
| 6,739,422 B2 | * | 5/2004 | Krude ................... B60G 27/00 |
| | | | 180/256 |
| D612,304 S | * | 3/2010 | Mahnig ........................ D12/160 |
| 8,297,632 B2 | * | 10/2012 | Webster ................. B22D 18/04 |
| | | | 280/93.512 |
| D686,952 S | * | 7/2013 | Rau ............................. D12/160 |
| 8,794,647 B2 | * | 8/2014 | Moessinger ........... B60G 7/008 |
| | | | 280/124.138 |
| 2006/0110213 A1 | | 5/2006 | Wolf |
| 2013/0181421 A1 | * | 7/2013 | Rohde ..................... B62D 7/18 |
| | | | 280/93.512 |
| 2015/0251695 A1 | | 9/2015 | Burgess et al. |

FOREIGN PATENT DOCUMENTS

| | | |
|---|---|---|
| JP | 2001-187583 A | 7/2001 |
| WO | WO 97/13674 | 4/1997 |

OTHER PUBLICATIONS

International Search Report in PCT/US2015/059017 dated Jan. 13, 2016.
Written Opinion of the International Searching Authority in PCT/US2015/059017.
United States Office Action dated Dec. 21, 2015 in co-pending U.S. Appl. No. 29/503,930.
United States Office Action dated Dec. 21, 2015 in co-pending U.S. Appl. No. 29/503,922.
United States Office Action dated Feb. 12, 2016 in co-pending U.S. Appl. No. 14/532,564.

* cited by examiner

FIG.11

| | EXAMPLES | | | | | COMPARATIVE EXAMPLES | |
|---|---|---|---|---|---|---|---|
| VIEWPOINT 1<br>WIDTH OF OPENING<br>(WIDTH OF ENLARGED PORTION) | TP1 | TP10 | TP9 | TP8 | | TP5 | TP6 |
| VIEWPOINT 2<br>HEIGHT OF OPENING | TP1 | TP7 | TP11 | TP18 | | | |
| VIEWPOINT 3<br>SHAPE OF OPENING | TP11 | TP17 | TP16 | TP12 | TP15 | | |

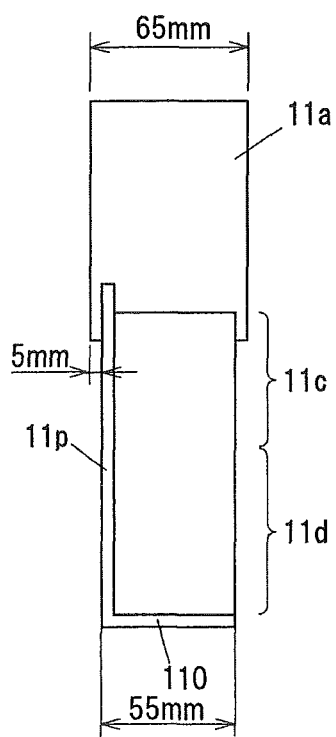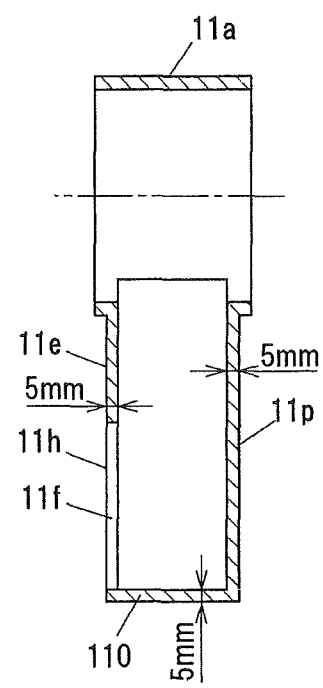

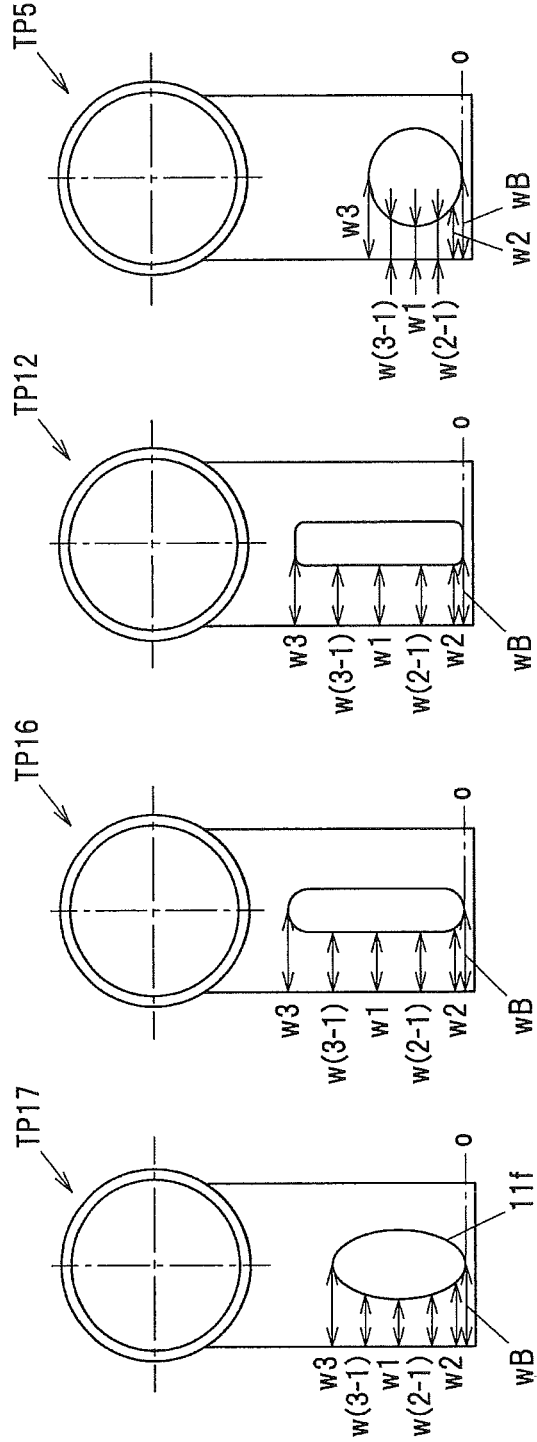

FIG.14

VIEWPOINT 1: WIDTH OF OPENING (WIDTH OF ENLARGED PORTION)

| TP NAME | TP1 | TP10 | TP9 | TP8 | TP5 (COMPARATIVE EXAMPLE) | TP6 (COMPARATIVE EXAMPLE) |
|---|---|---|---|---|---|---|
| SHAPE AND PRINCIPAL STRESS DISTRIBUTION CHART | TRANSLATION ROTATION | TRANSLATION ROTATION | TRANSLATION ROTATION | TRANSLATION ROTATION | TRANSLATION ROTATION | TRANSLATION ROTATION |
| WIDTH OF OPENING x(mm) | 45 | 25 | 55 | 35 | – | – |
| HEIGHT OF OPENING hL(mm) | 70 | 70 | 70 | 70 | – | – |
| AREA RATIO OF OPENING | 30.3% | 13.6% | 38.6% | 21.9% | – | – |
| ENLARGED PORTION DIMENSIONS RATIO w1/t1 | 4.0 | 6.0 | 3.0 | 5.0 | – | – |
| WEIGHT (kg) | 1.759 | 1.809 | 1.735 | 1.784 | 1.545 | 1.959 |
| MAXIMUM PRINCIPAL STRESS (TRANSLATION)(MPa) | 168 | 135 | 200 | 150 | 385 | 100 |
| MAXIMUM PRINCIPAL STRESS (ROTATION)(MPa) | 608 | 390 | 775 | 499 | 1050 | 160 |
| WEIGHT INDEX | 0.90 | 0.92 | 0.89 | 0.91 | 0.79 | 1.00 |
| MAXIMUM PRINCIPAL STRESS INDEX (TRANSLATION) | 0.44 | 0.35 | 0.52 | 0.39 | 1.00 | 0.26 |
| MAXIMUM PRINCIPAL STRESS INDEX (ROTATION) | 0.58 | 0.37 | 0.74 | 0.48 | 1.00 | 0.15 |

FIG.16

| | | TP1 | TP7 | TP11 | TP18 | TP5 (COMPARATIVE EXAMPLE) | TP6 (COMPARATIVE EXAMPLE) |
|---|---|---|---|---|---|---|---|
| TP NAME | | TP1 | TP7 | TP11 | TP18 | TP5 (COMPARATIVE EXAMPLE) | TP6 (COMPARATIVE EXAMPLE) |
| SHAPE AND PRINCIPAL STRESS DISTRIBUTION CHART | | TRANSLATION / ROTATION (608 / 168) | TRANSLATION / ROTATION (428 / 236) | TRANSLATION / ROTATION (485 / 207) | TRANSLATION / ROTATION (623 / 173) | TRANSLATION / ROTATION (1050 / 385) | TRANSLATION / ROTATION (160 / 100) |
| VIEWPOINT 2 HEIGHT OF OPENING | WIDTH OF OPENING x(mm) | 45 | 45 | 45 | 45 | — | — |
| | HEIGHT OF OPENING | 70 | 35 | 45 | 100 | — | — |
| | HEIGHT RATIO hL/K | 0.58 | 0.29 | 0.38 | 0.83 | — | — |
| | AREA RATIO OF OPENING | 30.3% | 13.2% | 18.1% | 44.8% | — | — |
| | WEIGHT(kg) | 1.759 | 1.815 | 1.799 | 1.711 | 1.545 | 1.959 |
| | MAXIMUM PRINCIPAL STRESS (TRANSLATION) (MPa) | 168 | 236 | 207 | 173 | 385 | 100 |
| | MAXIMUM PRINCIPAL STRESS (ROTATION) (MPa) | 608 | 428 | 485 | 623 | 1050 | 160 |
| | WEIGHT INDEX | 0.90 | 0.93 | 0.92 | 0.87 | 0.79 | 1.00 |
| | MAXIMUM PRINCIPAL STRESS INDEX (TRANSLATION) | 0.44 | 0.61 | 0.54 | 0.45 | 1.00 | 0.26 |
| | MAXIMUM PRINCIPAL STRESS INDEX (ROTATION) | 0.58 | 0.41 | 0.46 | 0.59 | 1.00 | 0.15 |

FIG. 18

| TP NAME | TP11 | TP17 | TP16 | TP12 | TP15 |
|---|---|---|---|---|---|
| SHAPE AND PRINCIPAL STRESS DISTRIBUTION CHART | TRANSLATION ROTATION | TRANSLATION ROTATION | TRANSLATION ROTATION | TRANSLATION ROTATION | TRANSLATION ROTATION |
| WIDTH OF OPENING (mm) | 45 | 36 | 22.5 | 22.5 | 50.8 |
| HEIGHT OF OPENING hL(mm) | 45 | 72 | 94.5 | 90 | 50.8 |
| SHAPE OF OPENING | REGULAR SQUARE SHAPE | ELLIPTICAL SHAPE | ELLIPSOIDAL SHAPE (RECTANGULAR SHAPE WITH ROUND CORNERS) | RECTANGULAR SHAPE | CIRCULAR SHAPE |
| AREA RATIO OF OPENING | 18.1% | 18.1% | 18.1% | 18.1% | 18.1% |
| w3 | 25 | 42.5 | 42.5 | 36.25 | 42.5 |
| w(3-1) | 25 | 27.0 | 31.25 | 31.25 | 20.73 |
| w1 | 20 | 24.5 | 31.25 | 31.25 | 17.10 |
| w(2-1) | 20 | 27.0 | 31.25 | 31.25 | 20.73 |
| w2 | 20 | 33.35 | 33.00 | 31.25 | 27.37 |
| wB | 25 | 42.5 | 42.5 | 36.25 | 42.50 |
| w1/t1 | 4.00 | 4.90 | 6.25 | 6.25 | 3.42 |
| w3/w1 | 1.25 | 1.73 | 1.36 | 1.16 | 2.49 |
| w(3-1)/w1 | 1.25 | 1.10 | 1.00 | 1.00 | 1.21 |
| w(2-1)/w1 | 1.00 | 1.10 | 1.00 | 1.00 | 1.21 |
| w2/w1 | 1.00 | 1.36 | 1.06 | 1.00 | 1.60 |
| wB/w1 | 1.25 | 1.73 | 1.36 | 1.16 | 2.49 |
| WEIGHT(kg) | 1.799 | 1.798 | 1.799 | 1.799 | 1.799 |
| MAXIMUM PRINCIPAL STRESS (TRANSLATION) (MPa) | 207 | 125 | 117 | 137 | 202 |
| MAXIMUM PRINCIPAL STRESS (ROTATION) (MPa) | 485 | 222 | 311 | 424 | 280 |
| WEIGHT INDEX | 0.92 | 0.92 | 0.92 | 0.92 | 0.92 |
| MAXIMUM PRINCIPAL STRESS INDEX (TRANSLATION) | 0.54 | 0.32 | 0.30 | 0.36 | 0.52 |
| MAXIMUM PRINCIPAL STRESS INDEX (ROTATION) | 0.46 | 0.21 | 0.30 | 0.40 | 0.27 |

VIEWPOINT 3
SHAPE OF OPENING
(AREA OF OPENING IS SUBSTANTIALLY THE SAME)

STEERING KNUCKLE APPARATUS FOR A VEHICLE

The present application is a Continuation-in-Part application of U.S. application Ser. No. 14/532,564 entitled "Steering Knuckle Apparatus for a Vehicle" filed Nov. 4, 2014 and assigned to the assignees of the present application, which is a Continuation-in-Part application of U.S. Design application Ser. Nos. 29/503,919, 29/503,922, 29/503,927, 29/503,929, 29/503,930, and 29/503,931 filed Sep. 30, 2014, the entire contents of which are incorporated herein by reference.

BACKGROUND OF THE INVENTION

Field of the Invention

The invention relates to a steering knuckle for a vehicle including a body part, a hollow part, an arm portion, and a connecting portion.

Description of the Related Art

In a conventional steering knuckle apparatus including a body part, a hollow part, an arm portion, and a connecting portion, a thickness of the material surrounding the hollow part is increased or a size of the hollow portion is decreased to increase rigidity of the steering knuckle (e.g., see JP-A 2001-187583 and JP-A 2001-114127). In a steering knuckle described in JP-A 2001-187583, at least two hollow parts formed in arms communicate with each other in a cylindrical part, and/or the hollow parts at least partially pass through the cylindrical part and communicate with an axial hole. Further, a direction of a hollow part opening, a shape in a vicinity of the hollow part opening, a wall thickness of the cylindrical part, and a wall thickness of a hollow part arm outer surface, are appropriately selected.

In a steering knuckle described in JP-A 2001-114127, a strut mounting arm projecting upward from a knuckle body is connected to an end of a strut, and a lower arm mounting arm projecting downward from the knuckle body is connected to a top of a lower arm through a king pin together. A hollow part is provided to open in an extending direction of the strut mounting arm on the middle in a longitudinal direction of a surface of the strut mounting arm on an outer side of an automobile body.

Please refer to JP-A 2001-187583 and JP-A 2001-114127.

SUMMARY OF THE INVENTION

However, in the above first-described steering knuckle having such a structure, the steering knuckle has a relatively large wall thickness of the cylindrical part and a relatively large wall thickness of a hollow part outer arm. Moreover, the hollow portion ratio is relatively small. The combination of the large thickness and the small hollow portion ratio significantly increases the weight of the steering knuckle.

However, in the above second-described steering knuckle having such a structure, rigidity of the steering knuckle is obtained by increasing the thickness to both sides along the hollow part which hinders downsizing/weight reduction of the steering knuckle.

Accordingly, it is an exemplary feature of the invention to provide a vehicle steering knuckle with an improved weight reduction in which the deformation and the damage of an arm portion are suppressed as compared to the conventional steering knuckles.

According to the first exemplary embodiment of the invention, a steering knuckle apparatus includes:
a body part to which an axle is attached;
an arm portion including one end integrally connected with an outer periphery of the body part and spreading outwardly from the body part along an extending axis; and
a connecting portion integrally connected with another end of the arm portion, the connecting portion being configured to be connected with a vehicle component,
wherein the arm portion includes:
a first portion integrally connected with the connecting portion in a direction along the extending axis;
a second portion interposed between the first portion and the body part; and
a hollow portion configured to communicate with the first portion and the second portion,
wherein the first portion includes a peripheral wall configured to enclose around the extending axis,
wherein the second portion includes a peripheral wall including an opening partially opened around the extending axis,
wherein, at a cross-section intersecting the extending axis, an end portion of the peripheral wall of the second portion on a side of the opening comprises an enlarged portion which is enlarged in width as compared with thickness of side portions adjacent to the end portion.

According to the second exemplary embodiment, a steering knuckle apparatus to which an axle is attached, includes:
a body part to which the axle is attached;
an arm portion including one end integrally connected with an outer periphery of the body part and spreading outwardly from the body part along an extending axis; and
a connecting portion integrally connected with another end of the arm portion, the connecting portion being configured to be connected with a vehicle component,
wherein the arm portion includes:
an opening having the extending axis therethrough; and
an end portion configured to surround the opening, a width of the end portion being defined from an edge of the opening to a distal edge of the end portion in a vehicle width direction,
wherein a first width at a center of the end portion is less than a second width measured nearer to the connecting portion of the end portion, and
wherein the first width at the center of the end portion is less than a third width measured nearer to the body part of the end portion.

According to the third exemplary embodiment, a steering knuckle apparatus to which an axle is attached includes:
a body part to which the axle is attached;
an arm portion including one end integrally connected with an outer periphery of the body part and spreading outwardly from the body part along an extending axis; and
a connecting portion integrally connected with another end of the arm portion, the connecting portion being configured to be connected with a vehicle component,
wherein the arm portion includes:
a portion interposed between the connecting portion and the body part;
an opening having the extending axis therethrough;
a hollow portion configured to communicate with the opening and the portion,
wherein the portion includes a peripheral wall having a first length, and
wherein, at a cross-section intersecting the extending axis, an end portion of the peripheral wall of the portion on a side of the opening comprises an enlarged portion which has a second length, the second length being greater than the first length.

In the above exemplary embodiments of the steering knuckle apparatus, various modifications can be made including the following modifications and changes, either singly or in combination.

(i) The enlarged portion can be located to intersect a direction of a force acting on the arm portion via the connecting portion.

(ii) At the cross-section intersecting the extending axis, the enlarged portion can be provided at both sides of the opening.

(iii) In the direction along the extending axis, the enlarged portion can be extending toward the first portion and integrated with the peripheral wall of the first portion.

(iv) In the direction along the extending axis, the enlarged portion can be extending toward the body part and integrated with the body part.

(v) A width of the enlarged portion can be increased from a center of the second portion toward the first portion or the body part along the extending axis.

(vi) An outer surface of the enlarged portion may include two or more surfaces formed along the extending axis.

(vii) At the cross-section intersecting the extending axis, the enlarged portion may intersect side portions of the peripheral wall to have a substantially T-shape.

Effects of the Invention

According to one exemplary embodiment of the invention, a technical problem of the conventional steering knuckles can be solved by providing an enlarged portion on a side of an opening. The weight reduction degree can be achieved by increasing a volume of a hollow portion and an area of an opening.

More specifically, weight reduction of a steering knuckle can be achieved by providing a hollow portion configured to communicate with a first portion and a second portion, and providing an opening at a peripheral wall surrounding the second portion. Moreover, rigidity of the arm portion can be improved by integrally (i.e., having a unitary construction as one piece) connecting a first portion to a connecting portion which is a point of action where a load acts on the arm portion, and providing the first portion with a closed structure comprising a peripheral wall enclosing a space around an extending axis, thereby suppressing the deformation of the arm portion when the load acts on the arm portion.

Additionally, a stress occurring on a surface of an end portion formed on an opening-side of the peripheral wall of the second portion can be relaxed by providing the end portion as an enlarged portion, thereby enhancing the strength of the second portion.

BRIEF DESCRIPTION OF THE DRAWINGS

Next, the present invention will be explained in more detail in conjunction with the attached exemplary drawings, wherein:

FIG. 11 is a diagram showing simplified models TP in Examples and comparative examples;

FIG. 13B shows side views of the respective models TP in FIG. 13A;

FIG. 13C shows 6-6 sectional views of the respective models TP in FIG. 13A;

FIG. 13D is a diagram showing the width of the enlarged portion in each model TP;

FIG. 13E is a diagram showing the width of the enlarged portion in each model TP;

FIG. 13F is a diagram showing the width of the enlarged portion in each model TP;

FIG. 13G is a diagram showing the width of the enlarged portion in each model TP;

FIG. 14 is a table showing relationship between respective parameters and maximum principal stress from the first viewpoint;

FIG. 16 is a table showing relationship between respective parameters and maximum principal stress from the second viewpoint;

FIG. 18 is a table showing relationship between respective parameters and maximum principal stress from the first viewpoint;

DETAILED DESCRIPTION OF THE EXEMPLARY EMBODIMENTS

Figure 1:
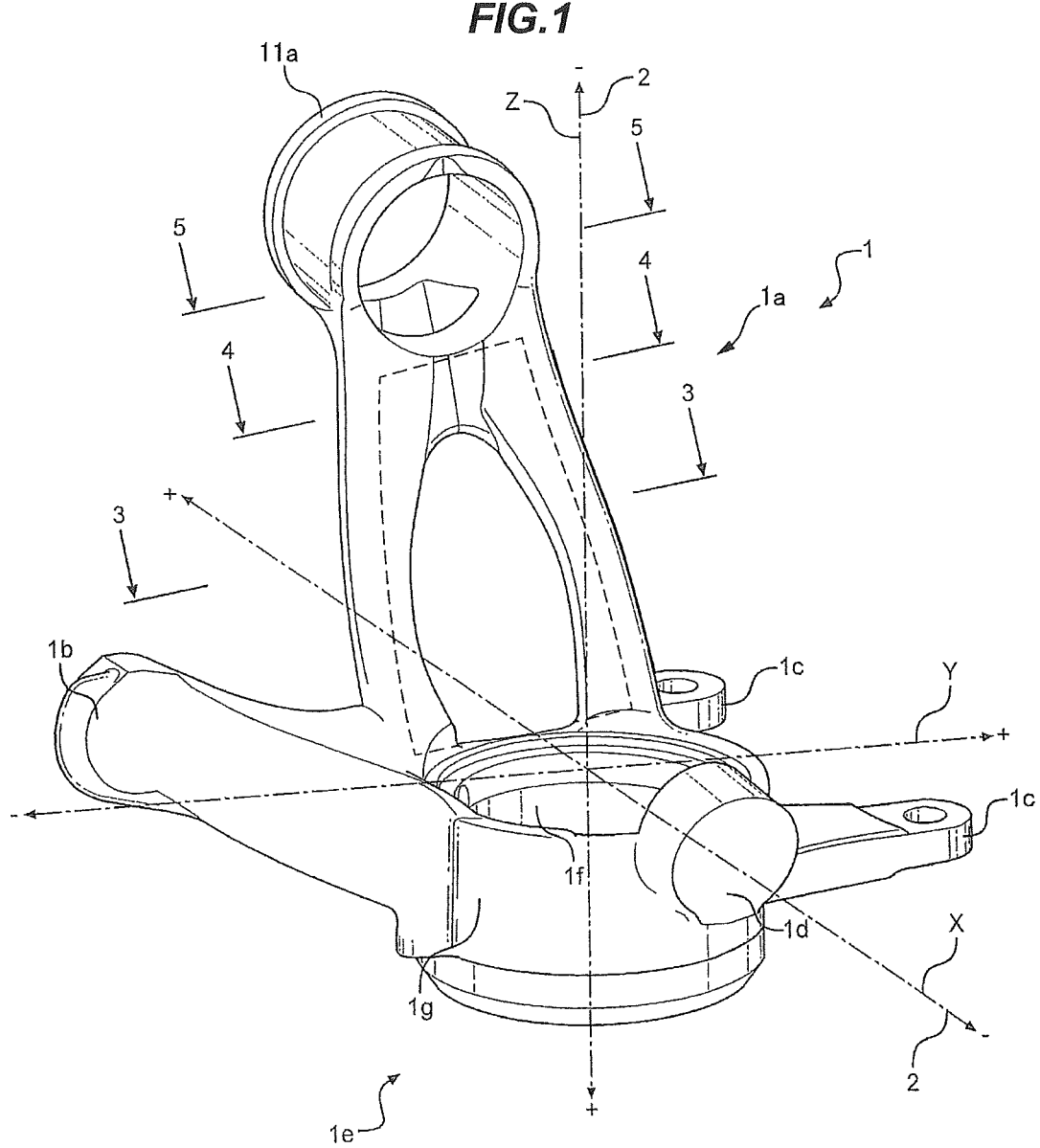
FIG. 1 is a perspective view showing a steering knuckle apparatus in a first embodiment of the present invention.
Figure 2:
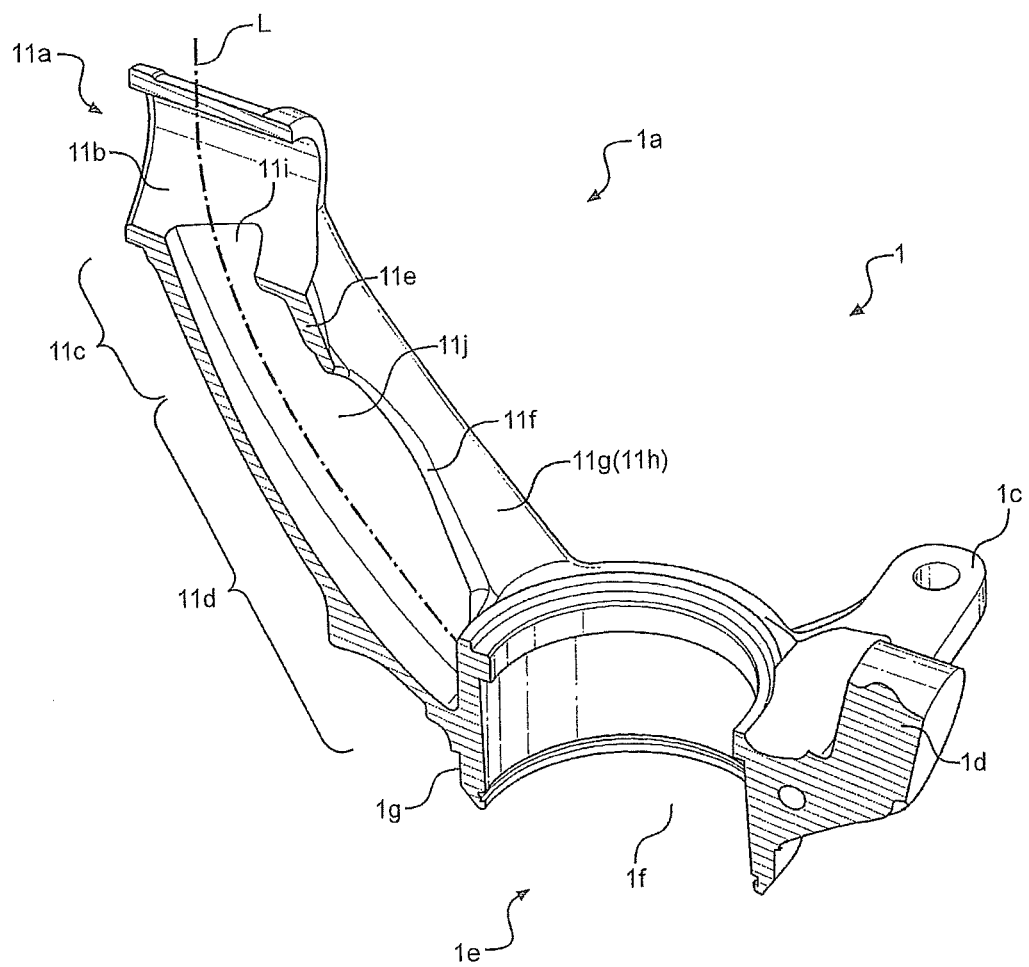
FIG. 2 is a cross-sectional view taken along a 2-2 plane in FIG. 1.

Next, the present invention will be explained in more detail in conjunction with the attached exemplary drawings. FIG. 1 is a perspective view showing a steering knuckle apparatus in a first exemplary embodiment of the invention. FIG. 2 is a cross-sectional view taken along a 2-2 plane in FIG. 1.

As shown in FIG. 1 and FIG. 2, the steering knuckle 1 is formed in one-piece (i.e., integrally having a unitary construction) and is provided with an arm portion (e.g., strut arm) 1a, a tie rod arm 1b, lower control arm-attaching arms 1d, a body part 1e, and a connecting portion 11a. A material of the steering knuckle 1 may be cast iron, aluminum, steel, or any similar material. The material of the steering knuckle is generally known to those skilled in the art and will not be described in greater detail.

The arm portion 1a includes one end integrally connected with an outer periphery 1g of the body part 1e and spreading outwardly from the body part 1e along an extending axis L (see FIG. 2). The connecting portion 11a is integrally connected with another end of the arm portion 1a. The connecting portion 11a is configured to be connected with a vehicle component (i.e., a strut). The body part 1e includes a brake arm 1c and an axle attaching hole 1f.

As shown in FIG. 2, the arm portion 1a is provided with a strut attaching hole 11b, a first portion 11c integrally connected with the connection portion 11a in a direction along the extending axis L, a second portion 11d which is provided between the first portion 11c and the body part 1e, an upper opening aperture 11i disposed on an inner surface of the connection portion 11a nearest the first portion 11c, and a hollow portion 11j which communicates with the first portion 11c and the second portion 11d. The first portion 11c has a peripheral wall 11e which encloses the extending axis L. The second portion 11d has a peripheral wall 11g including an opening 11f which is partially opened around the extending axis L. The opening 11f may have an oval shape but may have other exemplary shapes such as an omega-like shape.

Figure 3:
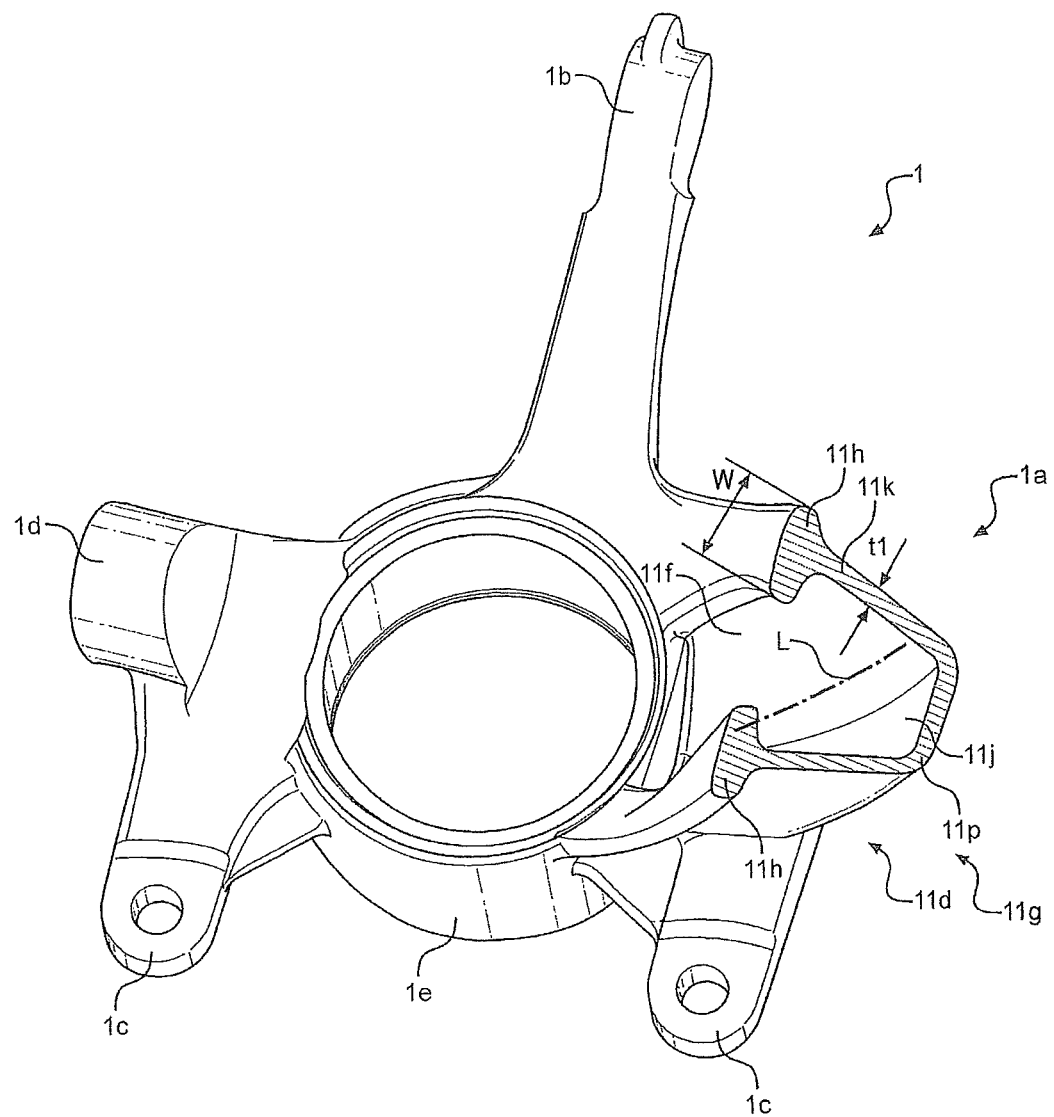
FIG. 3 is a view on arrow 3-3 in FIG. 1.

FIG. 3 shows a cross-section intersecting the extending axis L on arrow 3-3 of FIG. 1. An end portion 11h of the peripheral wall 11g of the second portion 11d on a side of the opening 11f has an enlarged portion (11h, having width W) which is enlarged in its width relative to side portions (11k, having thickness t1) of the peripheral wall 11g adjacent to the end portion 11h. A width W (i.e., second length) of the enlarged portion 11h is greater than a thickness t1 (i.e., first length) of the side portion 11k as the other portion. The width W may be between 2.0 and 7.0 times greater than the thickness t1. The width W may be between 2.75 and 6.75 times greater than the thickness t1. More preferably, the width W may be between 4.2 and 6.75, 3.0 and 5.6, or 2.75 and 4.6 times greater than the thickness t1. Most preferably, the width W may be 5.3, 5.5, or 4.5 times greater than the thickness t1. It should be noted that the thickness t1 may be an average width in the case where the thickness t1 of the side portion 11k is not uniform.

Further, the enlarged portion 11h is provided at both sides of the opening 11f at the cross-section intersecting the extending axis L. The enlarged portion 11h extends in a direction along the extending axis L toward the body part 1e. The enlarged portion 11h is formed integrally with the body part 1e.

Figure 4:
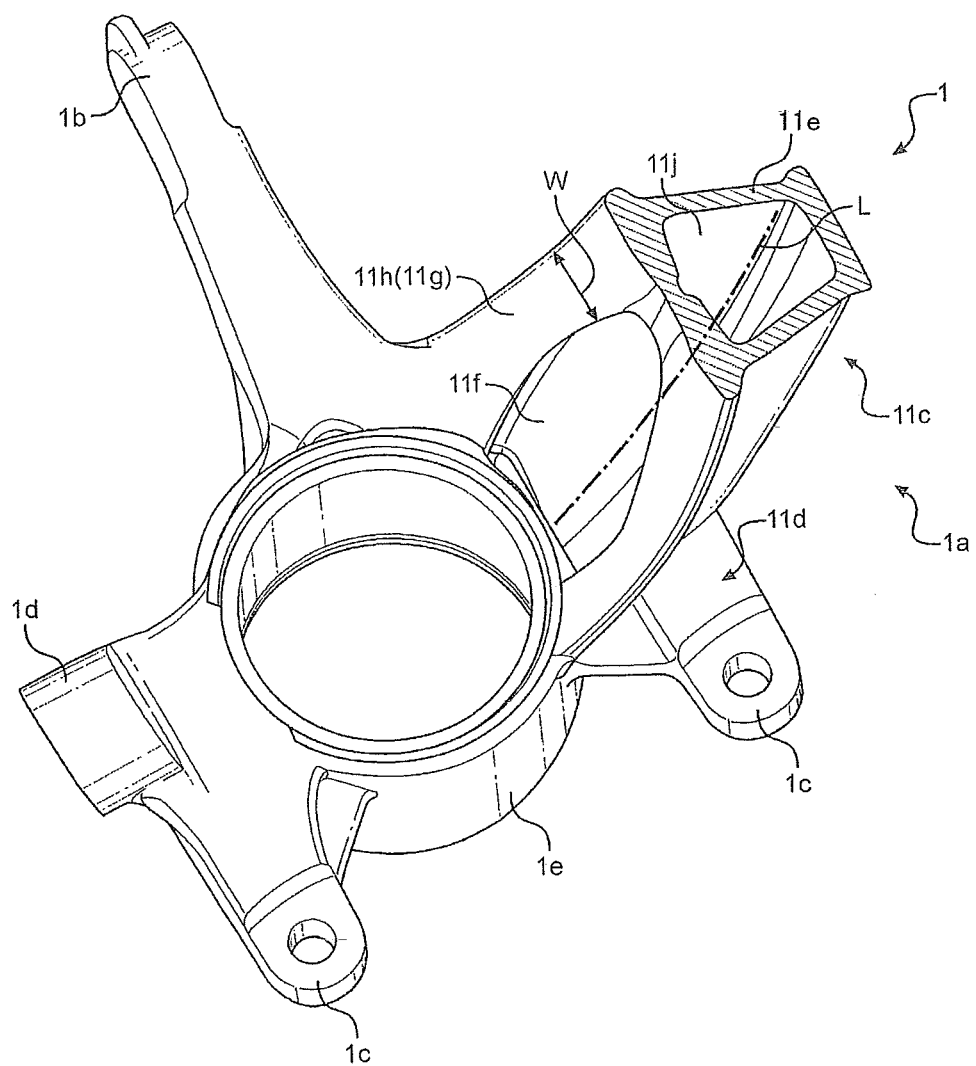
FIG. 4 is a view on arrow 4-4 in FIG. 1.

Turning to FIG. 4, FIG. 4 shows a cross-section intersection of the extending axis L on arrow 4-4 of FIG. 1. The enlarged portion 11h extends in a direction along the extending axis L toward the first portion 11c. The enlarged portion 11h is integrally formed with the peripheral wall 11e of the first portion 11c.

Figure 5:
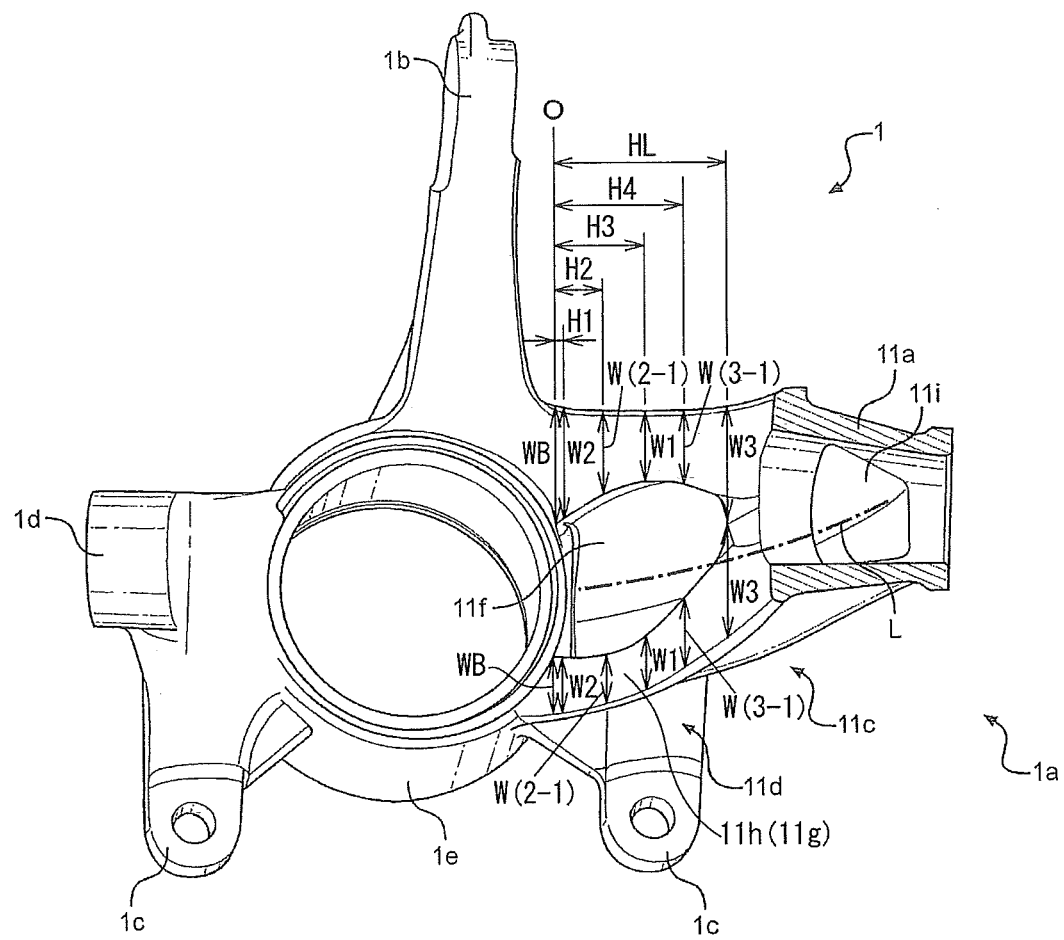
FIG. 5 is a view on arrow 5-5 in FIG. 1.

FIG. 5 shows a cross-section intersection of the extending axis L on arrow 5-5 of FIG. 1. As seen in FIG. 5, the oval (e.g., omega-like) cross-section of the opening 11f varies a width W of the enlarged portion 11h at various points along the extending axis L. The enlarged portion 11h illustrated in an upper part in FIG. 5 (the Y (−) side in FIG. 1) and the enlarged portion 11h in a lower part in FIG. 5 (the Y (+) side in FIG. 1) are arranged as one pair via the opening 11f. Although the enlarged portions 11h in the upper part and the lower part in FIG. 5 are asymmetrical to each other in this exemplary embodiment, the width W of the enlarged portion 11h increases from substantially a center of the second portion 11d toward the first portion 11c along the extending axis L. The width W of the enlarged portion 11h increases from substantially the center of the second portion 11d toward the body part 1e along the extending axis L, in both the upper and lower parts in FIG. 5.

(W1)

Next, the detail of the width W of the enlarged portion 11h in the upper part of FIG. 5 will be explained below (similar explanation is applicable to the width W of the enlarged portion 11h in the lower part of FIG. 5).

In the above exemplary embodiment of the steering knuckle apparatus, as seen in FIG. 5, a first width W1 of the enlarged portion 11h is defined as a width which is measured at the location nearest to a distal edge of the enlarged portion 11h where an edge of the opening 11f constitutes an outer surface of the arm portion 1a. Here, when the position of the first portion 11c-side edge of the opening 11f along the extending axis L direction is O and the position of the body section 1e-side edge of the opening 11f along the extending axis L direction is HL, a position H3 of the first width W1 is substantially at the middle of the position O and the position HL in the aforementioned exemplary embodiment.

(W2)

Then, a second width W2 of the enlarged portion 11h is defined as a width of a region extending from a position H2 located at the center between the position H3 and the position O until the position O, which is measured at an arbitrary position H1 located in parallel with the first width W1.

Also, when a width of the enlarged portion 11*h* at the position H2 is WB and a width of the enlarged portion 11*h* at the position O is W(2-1), a relationship W1≤W(2-1)≤W2≤WB is established. The second width W2 preferably is greater than the first width W1 (W1<W2). More preferably, the second width W2 may be between 1.1 and 1.7 times greater than the first width W1. Even more preferably, the second width W2 may be between 1.15 and 1.55 times greater than the first width W1. The second width W2 may be between 1.2 and 1.51 times greater than the first width W1. Most preferably, the second width W2 may be 1.22, or 1.5 times greater than first width W1. The above relationship is similarly established for the enlarged portion 11*f* of the lower part of FIG. 5.

(W3)

Then, a third width W3 of the enlarged portion 11*h* is defined as a width of a region extending from a position H4 located at the center between the position H3 and the position HL until the position HL, which is measured at the arbitrary position H1 located in parallel with the first width W1.

Also, when a width of the enlarged portion 11*h* at the position H4 is W(3-1), a relationship W1≤W(3-1)≤W3 is established. The third width W3 preferably is greater than the first width W1. More preferably, the second width W3 may be between 1.1 and 2.6 times greater than the first width W1. Even more preferably, the second width W3 may be between 1.3 and 2.2 times greater than the first width W1. The third width W3 may be between 1.3 and 1.7, or between 1.65 and 2.2 times greater than the first width W1. Most preferably, the second width W3 may be 1.35, 1.65, or 2.15 times greater than first width W1. The above relationship is similarly established for the enlarged portion 11*f* of the lower part of FIG. 5.

It should be noted that the arm portion 1*a* in the first exemplary embodiment curves along the extending axis L. In such a configuration, O, H1 to H4, and HL are defined as the positions viewed from the direction in which an area of the opening 11*f* becomes the maximum when the arm portion 1*a* is viewed perpendicularly to the extending axis L.

Figure 6:
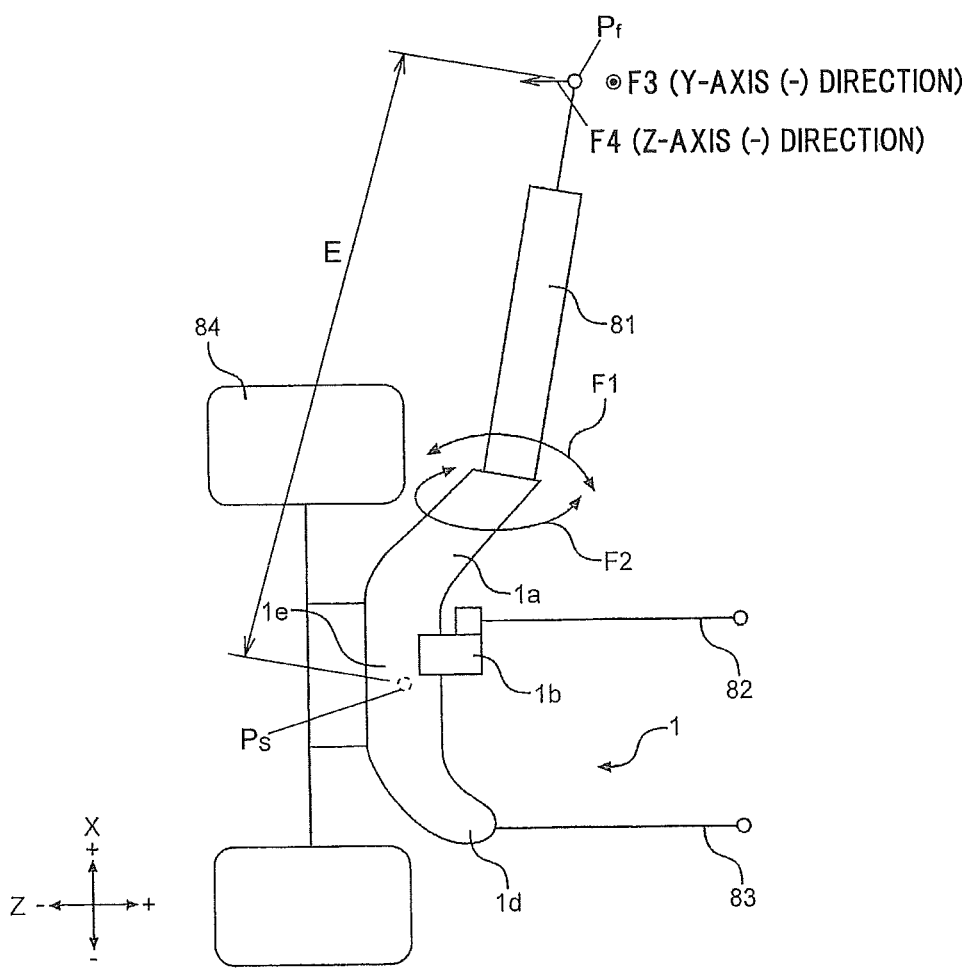
FIG. 6 is a schematic plan diagram of a suspension device to which the present invention may be applied.

Referring to FIG. 6, the vehicle steering knuckle 1 may be attached to a suspension device of a motor vehicle including a strut 81, a tie rod 82, and a lower control arm 83, and is positioned adjacent a tire 84 of the motor vehicle. The enlarged portion (11*h*, W) is located to intersect a direction of a force F1 acting on the arm portion 1*a* via the connection portion 11*a*. A height direction of a vehicle body is defined as (+) being upward and (−) being downward. A longitudinal direction of the vehicle body is defined as (+) being forward and (−) being backward.

Next, a shape of the cross-section of FIG. 3 will be described in reference to FIG. 7A and FIG. 8.

Figure 7A:
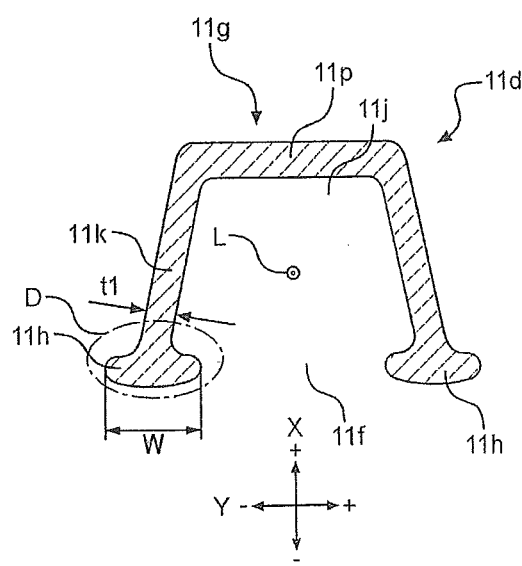
FIG. 7A is a cross-sectional view of the steering knuckle in FIG. 3.

As shown in FIG. 7A, the cross-section has a substantially modified U-shape surrounding the hollow portion 11*j* which is formed by the peripheral wall 11*g* of the second portion 11*d*. The peripheral wall 11*g* includes the enlarged portion 11*h*, a pair of side portion 11*k*, and a back portion 11*p*. The side portions 11*k* are formed at each end of the back portion 11*p*. The back portion 11*p* and the side portions 11*k* are integrally formed and connected with a fillet (i.e., substantially angled, tapered, or rounded corner) on an interior and exterior corner. The side portions 11*k* are angled from a trough (i.e., angled with respect to a line extending along the trough) of the U-shape and the side portions 11*k* substantially have the thickness t1. The back portion 11*p* substantially has the thickness t1. The thickness t1 of the back portion 11*p* and the side portions 11*k* may be a uniform thickness. However, the thickness t1 of the back portion 11*p* and the side portions 11*k* may be non-uniform and vary based on mechanical stress requirements. The enlarged portion 11*h* is formed at each end of the side portions 11*k* and substantially has the width W.

Figure 8:
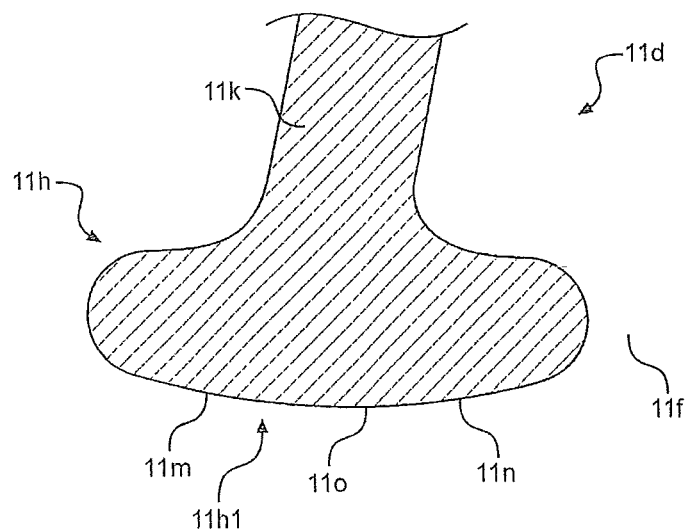
FIG. 8 is an enlarged view of part D of FIG. 7A.

FIG. 8 is an enlarged view of part D of FIG. 7A. As shown in FIG. 8, the enlarged portion 11*h* is integrally connected with a fillet at the end of the side portions 11*k*. The fillet size is set to increase the mechanical strength of the steering apparatus 1. The enlarged portion has a substantially tau-shaped cross-section. However, other cross-sections may be available. An outer surface 11*h*1 of the enlarged portion 11*h* has a plurality of surfaces (11*m*, 11*n*) which slope from the thickest portion of the enlarged portion away from the side portions 11*k* and meet at a round portion 11*o* substantially located at a center of the enlarged portion 11*h*. Corners of the enlarged portion 11*h* are rounded (e.g., angled, arc-shaped, elliptical-shaped, etc.).

Functions and Effects of the First Embodiment

The following functions and effects are obtained in the first embodiment.

According to the embodiment of the steering knuckle apparatus 1, a stress occurring on a surface of the end portion 11*h* formed on the opening-side of the peripheral wall 11*g* of the section portion 11*d* can be relaxed by providing the end portion 11*h* as the enlarged portion, thereby enhancing the strength of the second portion.

Moreover, weight reduction can be achieved when the hollow portion 11*j* is configured to communicate with the first portion 11*c* and the second portion 11*d*, and by providing the opening 11*f* at the peripheral wall 11*g* surrounding the second portion 11*d*.

Even further, rigidity of the arm portion can be improved by integrally (as one piece) connecting the first portion 11*c* to the connecting portion 11*a* which is a point of action where a load acts on the arm portion 1*a*.

Rigidity of the arm portion 1*a* can also be improved by providing the first portion 11*c* with a closed structure having the peripheral wall 11*e* enclosing a space around the extending axis L. The above configuration of the arm portion 1*a* can suppress the deformation of the arm portion 1*a* when the load acts on the arm portion 1*a*.

Also, mechanical strength of the steering knuckle apparatus 1 can be enhanced by providing the enlarged portion 11*h* on both sides of the opening 11*f*. Mechanical strength of the steering knuckle apparatus 1 can be further enhanced by integrally forming the enlarged portion 11*h* with the peripheral wall 11*e* of the first portion 11*c*. Mechanical strength of the steering knuckle apparatus 1 can be even further enhanced by integrating the enlarged portion 11*h* with the body part 1*e*.

According to the above embodiment of the steering knuckle apparatus 1, a torsional stress can be reduced by increasing the width W of the enlarged portion 11*h* along the extending axis L from the center of the second portion 11*d* toward the first portion 11*c* or toward the body part 1*e* (i.e., W1<W2, W1<W3).

Variations of the Cross-Section of FIG. 7A

FIGS. 7B to 7E are cross-sectional views showing modifications in which shapes of the cross-section of FIG. 7A may be changed so as to provide a modified weight efficient structure and modified cost effective structure that provides the required mechanical strength to carry loads F1 and F2.

In general, in order to further suppress the stress concentration at the end portion, further enhance weight reduction, and/or increase mechanical strength of the steering knuckle apparatus, the cross-sectional surface shape of the enlarged portion 11h may be modified as shown in FIGS. 7B to 7E.

Figure 7B:
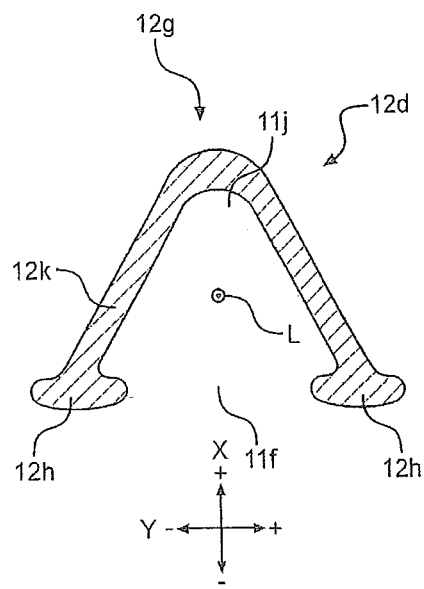
FIG. 7B is a cross-sectional view of the steering knuckle in FIG. 3.

FIG. 7B shows the cross-section of FIG. 3 in a modification in which a shape of the cross-section may be changed. As shown in FIG. 7B, the cross-section has a substantially modified V-shape surrounding the hollow portion 11j which is formed by a peripheral wall 12g of a second portion 12d. The peripheral wall 12g includes a pair of side portions 12k which merge as the apex of the V-shape and enlarged portions 12h. The side portions 12k are integrally formed and connected with a fillet at the apex (i.e., angled, arc-shaped, or rounded corner) on an interior and exterior corner which rounds the apex between the side portions 12k. The side portions 12k are angled from the trough of the V-shape and the side portions 12k substantially have the thickness t1. The enlarged portions 12h are formed at each end of the side portions 12k and substantially has the width W.

The substantially modified V-shape of FIG. 7B may further improve the steering knuckle apparatus 1 and have similar beneficial effects of the exemplary embodiment of FIG. 7A.

Figure 7C:
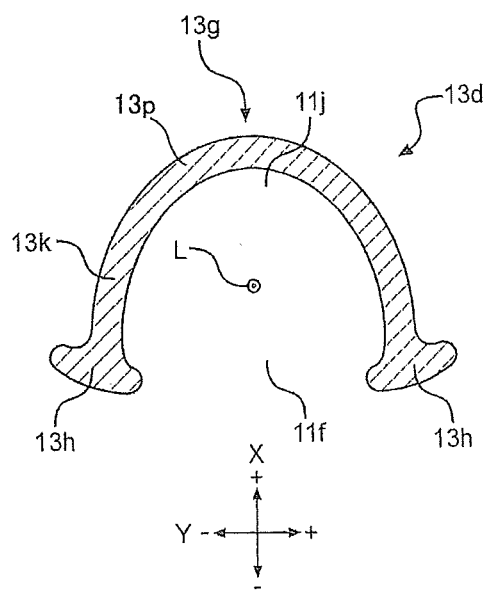
FIG. 7C is a cross-sectional view of the steering knuckle in FIG. 3.

FIG. 7C shows the cross-section of FIG. 3 in a modification in which a shape of the cross-section may be changed. As shown in FIG. 7C, the cross-section has a substantially modified arc-shape (e.g., substantially semi-circular) surrounding the hollow portion 11j which is formed by a peripheral wall 13g of a second portion 13d. The peripheral wall 13g includes a pair of side portions 13k and enlarged portions 13h. The enlarged portions 13h and the side portions 13k are integrally formed. The enlarged portions 13h are formed at each end of the side portions 13k and substantially have the width W. The enlarged portions 13h are angled upwardly and away from the opening 11f. The enlarged portions 13h are positioned such that more of the width W of the enlarged portions 13h are disposed on a side of an exterior surface of the side portions 13k. The side portions 13k form a continuous curve along the arc-shape between the enlarged portions 13h. The side portions 13k substantially have the thickness t1.

The substantially modified arc-shape of FIG. 7C may further improve the steering knuckle apparatus 1 and have similar beneficial effects of the exemplary embodiment of FIG. 7A.

Figure 7D:
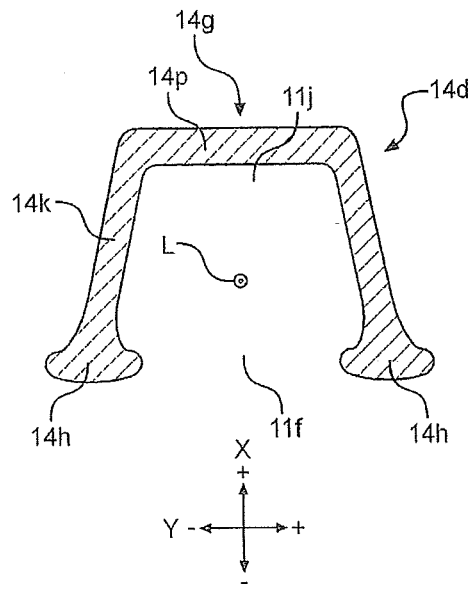
FIG. 7D is a cross-sectional view of the steering knuckle in FIG. 3.

FIG. 7D shows the cross-section of FIG. 3 in a modification in which a shape of the cross-section may be changed. As shown in FIG. 7D, the cross-section has a substantially modified U-shape similar to the U-shape of FIG. 7A. Therefore, only the differences will be discussed. A thickness of the side portions 14k gradually increases from a back portion 14p to the enlarged portions 14h. At a point where the side portions 14k connect to the enlarged portion 14h, a fillet on an exterior surface of the side portions 14k may have a radius greater than a radius of the fillet on an exterior surface of the side portion 11k. The enlarged portions 14h are positioned such that more of the width W of the enlarged portions 14h are disposed on a side of the exterior surface of the side portions 14k.

The substantially modified arc-shape of FIG. 7D may further improve a stress occurring on a surface of the enlarged portions 14h formed on the opening-side of the peripheral wall 14g of the section portion 14d can be relaxed by a thicker connection point between the enlarged portions 14h and the side portions 14k, thereby enhancing the strength of the second portion.

Figure 7E:
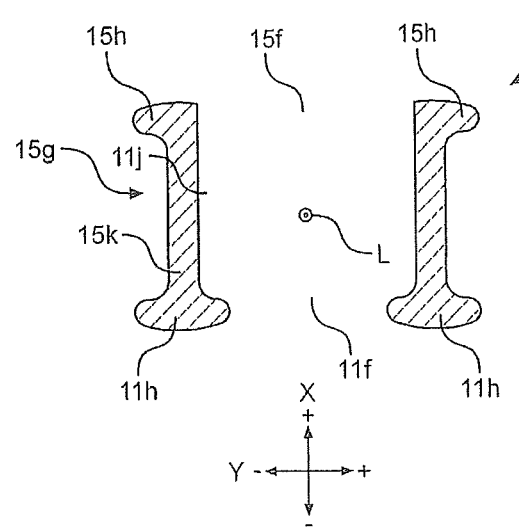
FIG. 7E is a cross-sectional view of the steering knuckle in FIG. 3.

Further, FIG. 7E shows the cross-section of FIG. 3 in a modification in which a shape of the cross-section may be changed. As shown in FIG. 7E, the cross-section has side portions 15k of a peripheral wall 15g of the second portion 15d. Enlarged portions 11h are formed at a first end of the side portions 15k with the opening 11f being disposed between the side portions 15k at the first end. Enlarged portions 15h are formed at a second end of the side portions 15k with an opening 15f being disposed between the side portions 15k at the second end. The opening 11f and the opening 15f communicate with each other to form a through hole. The side portions 15k are parallel to the height direction of the vehicle body (i.e., X-axis). The enlarged portions 15h protrude on an exterior surface of the side portions 15k and are co-planar on an interior surface of the side portions 15k. The enlarged portions 15h are integrally connected with a fillet at the first end of the side portions 15k.

The substantially modified shape of FIG. 7E may further improve the steering knuckle apparatus 1 and have similar beneficial effects of the exemplary embodiment of FIG. 7A.

Figure 7F:
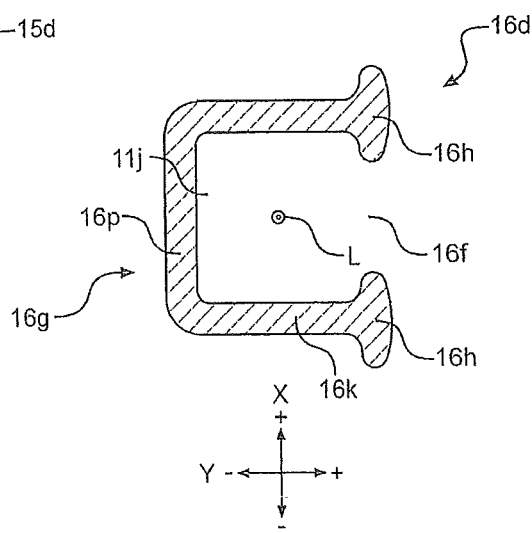
FIG. 7F is a cross-sectional view of the steering knuckle in FIG. 3.

FIG. 7F shows the cross-section of FIG. 3 in a modification in which a shape of the cross-section may be changed. As shown in FIG. 7F, the cross-section has a substantially U-shape surrounding the hollow portion 11j which is formed by the peripheral wall 16g of the second portion 16d. The peripheral wall 16g includes a back portion 16p, a pair of side portions 16k adjacent to end portions of the back portion 16p, and enlarged portions 16h. The side portions 16k surround an opening 16f and are parallel to a width direction of the vehicle body (i.e., Y-axis). The back portion 16p is parallel to the height direction of the vehicle body (i.e., X-axis). The back portion 16p and the side portions 16k are integrally formed and connected with a fillet (i.e., rounded corner) on an interior and exterior corner. The back portion 16p and the side portions 16k substantially have the thickness t1. The enlarged portions 16h are formed at each end of the side portions 16k and substantially has the width W.

The U-shape of FIG. 7F may further improve the steering knuckle apparatus 1 and have similar beneficial effects of the exemplary embodiment of FIG. 7A.

According to the modifications above of the steering knuckle apparatus 1, the modification may further enhance the strength of the second portion, reduce weight, improve rigidity, further suppress the deformation of the arm portion 1a when the load acts on the arm portion 1a, enhance mechanical strength, and reduce torsional stress.

Modelling of Arm Portion and Connecting Portion

Figure 9:
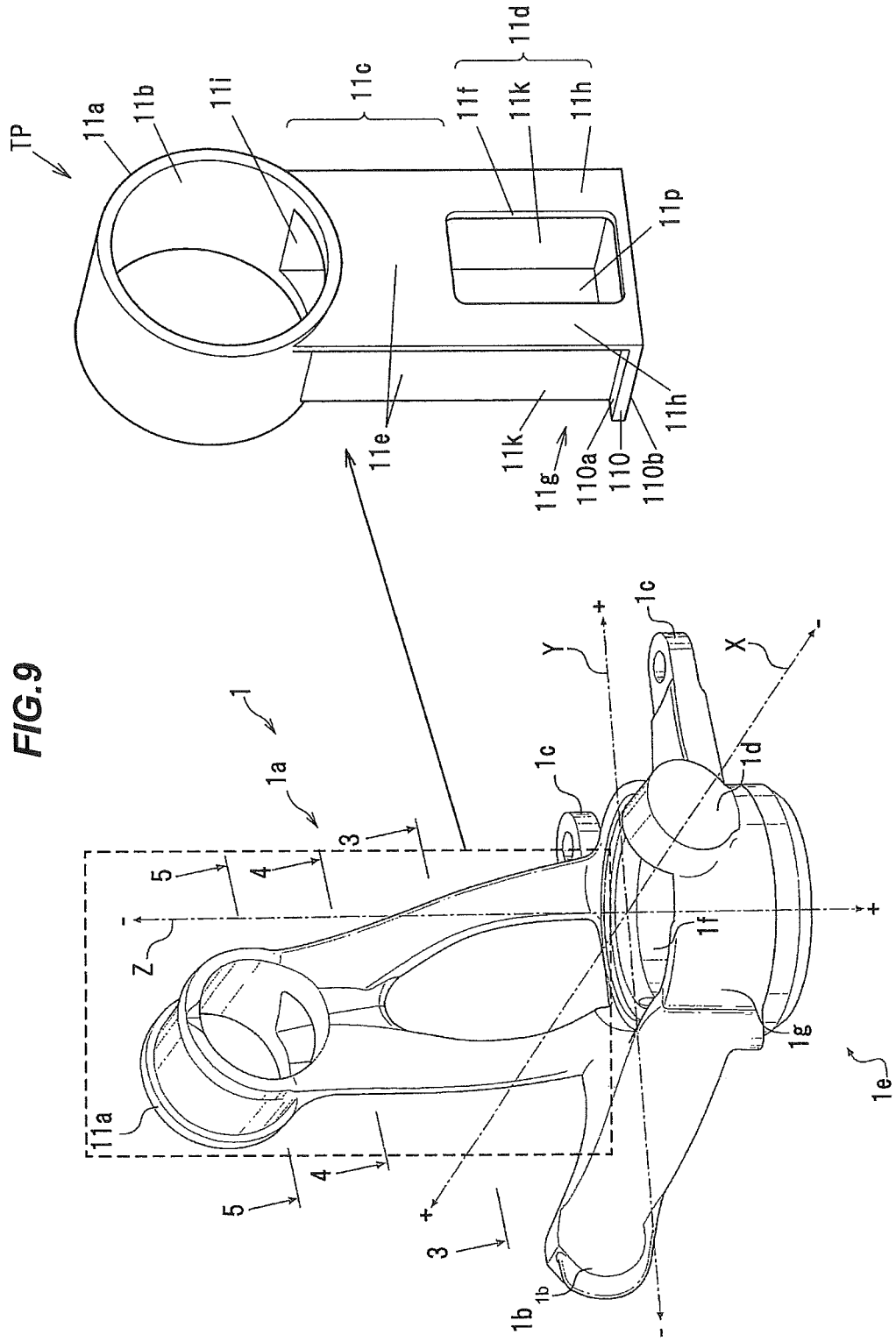
FIG. 9 is an explanatory diagram for explaining a simplified model in which an arm portion and a connecting portion of the vehicle steering knuckle shown in FIG. 1 are simplified.
Figure 10:
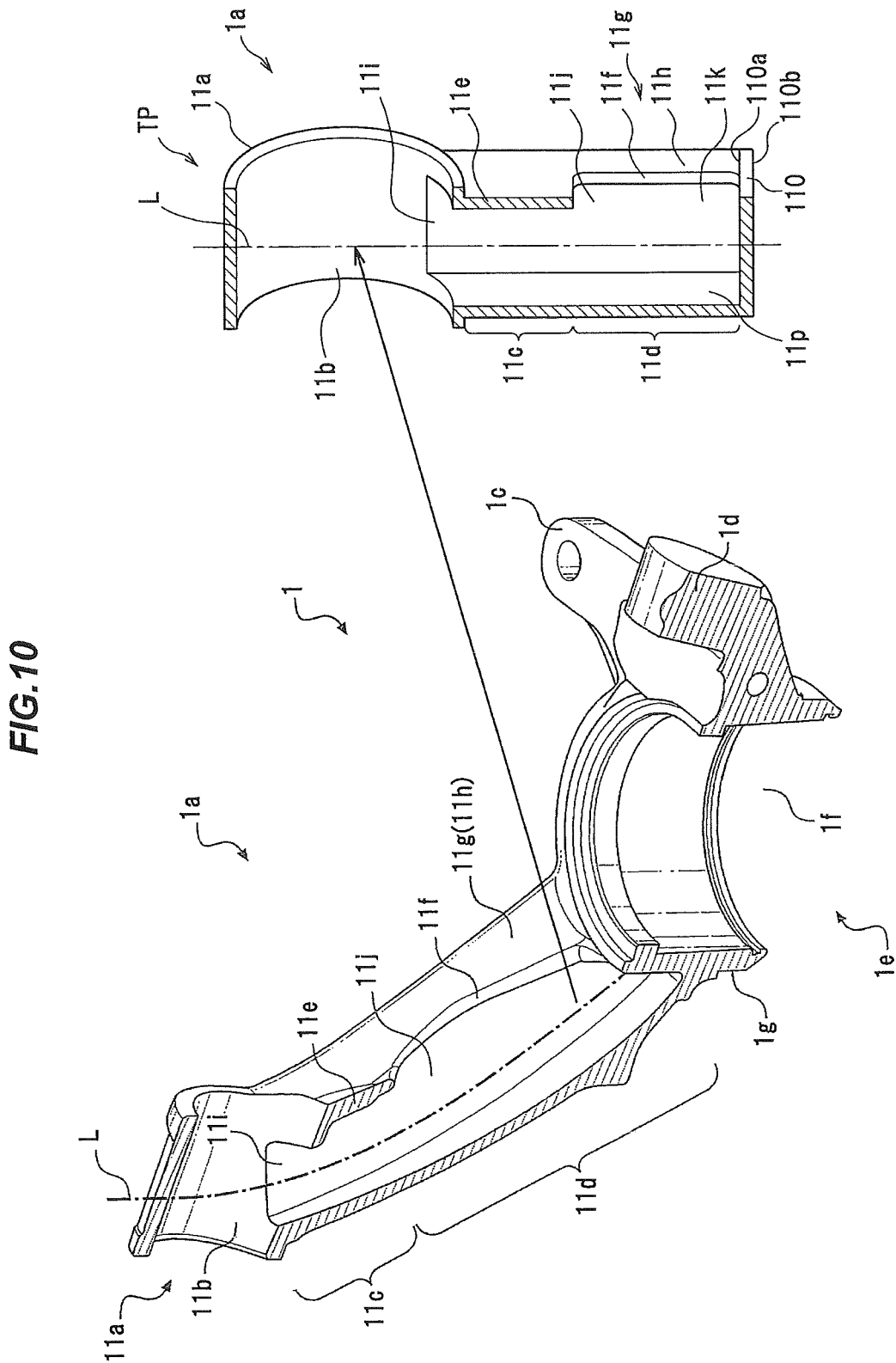
FIG. 10 is an explanatory diagram for explaining a simplified model in which an arm portion and a connecting portion of the vehicle steering knuckle shown in FIG. 1 are simplified.

FIG. 9 and FIG. 10 are explanatory diagrams for explaining Examples in which the arm portion 1a and the connecting portion 11a of the vehicle steering knuckle 1 shown in FIG. 1 are simplified. A model TP in Example is a simplified model in which the outer periphery 1g of the body section 1e surrounded by a broken line in FIG. 9 is considered as a rigid body so that the arm portion 1a and the connecting portion 11a are simplified. According to the model TP in Example, the extending axis L is considered as a straight line and the peripheral wall 11e of the first portion 11c is considered to have a rectangular cross section, and a pair of side portions 11k of the second portion 11d are considered to be parallel with each other and perpendicular to the back portion 11p as shown in FIG. 10. Then, influences of the shape and the dimensions of the opening 11f the maximum principal stress and the weight are studied.

FIG. 11 shows simplified models in Examples and comparative examples. In FIG. 11, TP1, TP7 to TP12, and TP15 to TP18 are models of Examples whereas TP5 and TP6 are models of comparative examples. It should be noted that either or both of the models of Examples and comparative examples may be collectively referred to as "Model TP".

At first, with referring to FIG. 9 and FIG. 13A to FIG. 13C, a common structure in the model TP for respective Examples and comparative examples will be described below. The height of all models TP is 220 mm. The connecting portion 11a has a cylindrical shape with an outer diameter of 100 mm, an inner diameter (i.e., a diameter of the strut-attaching hole 11b) of 89 mm, and a depth of 65 mm. The peripheral wall 11g of the arm portion 1a has a structure that two side portions 11k are connected perpendicularly to the back portion 11p and that the thickness t1 of the back portion 11p and the thickness of the side portions 11k are equally 5 mm. One end portion of this peripheral wall 11g is connected to a bottom portion 110 of the arm portion 1a having a plate shape with a width of 85 mm, a depth of 55 mm, and a thickness of 5 mm, while the other end portion of the peripheral wall 11g is connected perpendicularly to the center of a body part of the connecting portion 11a having a cylindrical shape. When a minimum distance between the bottom portion 110 of the connecting portion 11a and a lower surface 110b of the arm portion 1a-side edge is a height K of the arm portion 1a, the value of K should be 120 mm because the value of K is a difference between 220 mm as the height of all the models TP and 100 mm as the outer diameter of the connecting portion 11a. Also, inner walls of the connecting portion 11a are connected to inner walls of the peripheral wall 11g thereby form an upper opening 11i.

Figure 12A:
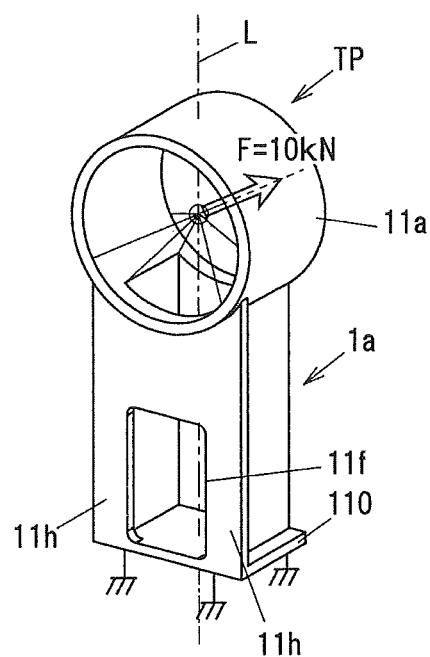
FIG. 12A is a diagram showing an input position and directions of external force F for evaluating the model TP.
Figure 12B:
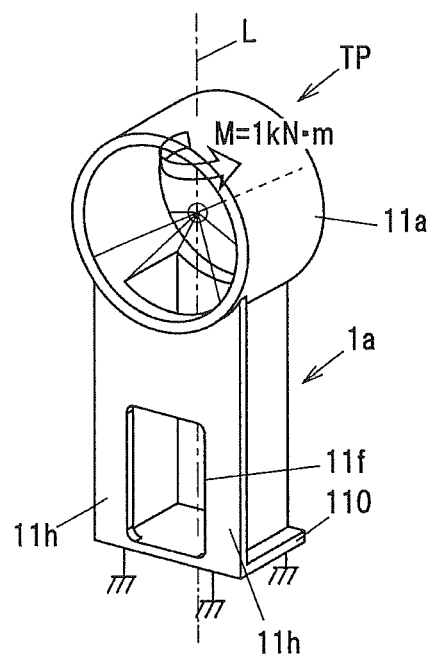
FIG. 12B is a diagram showing an input position and directions of external force M for evaluating the model TP.

Also, the model TP is made of a spheroidal graphite cast iron material equivalent (specific gravity of 7.15 and Young's modulus of 170 GPa). Next, the external force to be applied to the model TP will be described with referring to FIG. 12A and FIG. 12B. FIG. 12A and FIG. 12B are explanatory diagrams for showing the input position and directions of the external force for evaluating the model TP. The external forces applied to the model TP are an external force F and an external force M. The external force F is applied in a direction which is along a central axis of the connecting portion 11a and directed from the opening 11f-side toward the side opposite to the opening 11f-side (translation direction) as shown in FIG. 12A. The external force M is applied in a direction around the extending axis L (rotation direction) as shown in FIG. 12B. The value of the external force F is 10 kN and the value of the external force M is 1 kN·m.

Next, the shape of the model of Example having the enlarged portion 11h and the measuring position of the enlarged portion 11h will be described below.

Figure 13A:
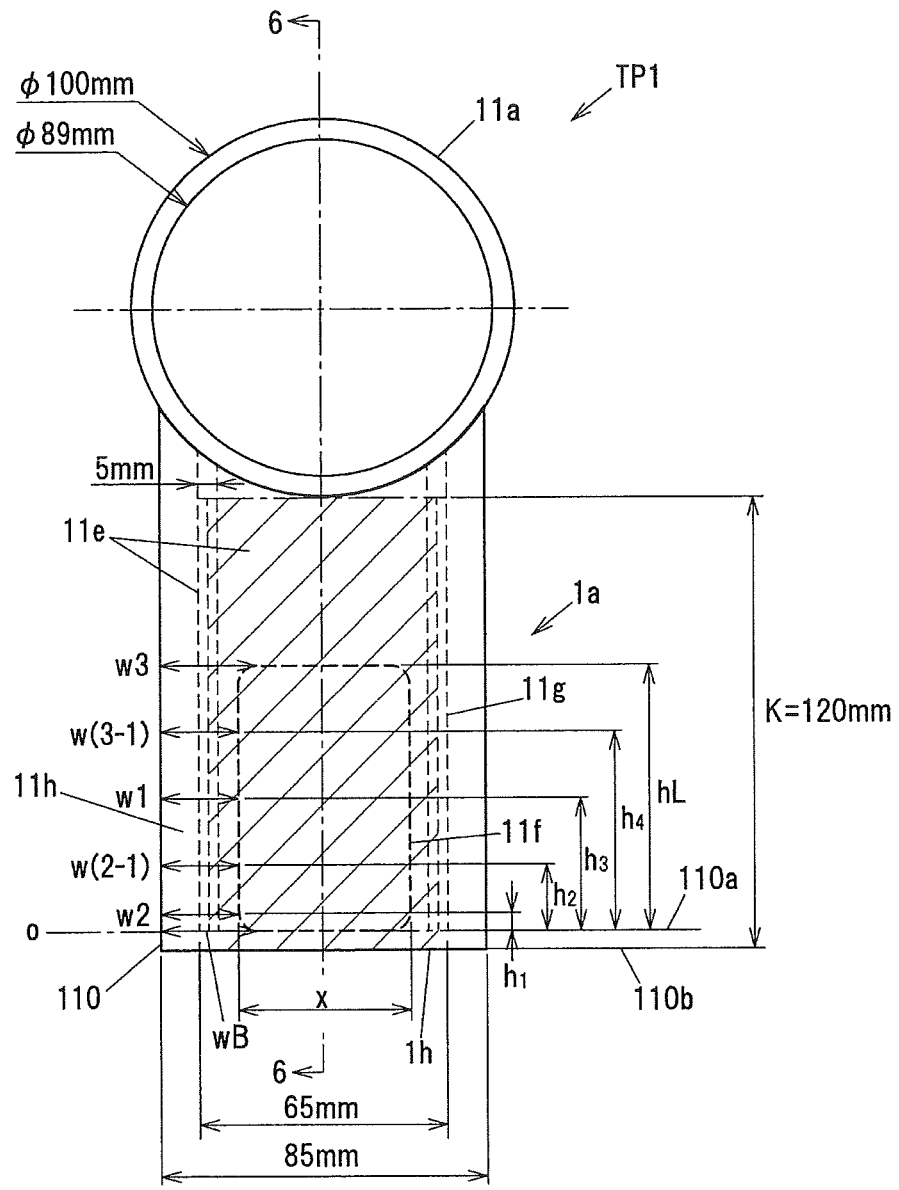
FIG. 13A shows front views of respective models TP, each of which describes a width and an enlarged portion.

In each model TP, i.e., TP1, TP7 to TP12, and TP15 to TP18 of Examples shown in FIG. 9, a peripheral wall 11e is provided entirely at a perimeter in the first portion 11c, which each model comprises a differently shaped opening 11f and the enlarged portions 11h provided on both sides of the opening 11f in the second portion 11d. Here, the width of the arm portion 1a including the enlarged portions 11h is 85 mm in all models of Examples, and the length of a portion of the enlarged portion 11h extending outwardly from an outer circumference of the side portion 11k is 10 mm. As shown in FIG. 13A, the thickness of the peripheral wall 11e and the thickness of the enlarged portion 11h are equally 5 mm in all models of Examples.

FIGS. 13A to 13G are explanatory diagrams for explaining the measuring position of the width of the enlarged portion 11h in each model TP in Examples.

In view of the shape of the opening 11f, FIG. 13A shows the model TP1 in which the opening 11f has a short rectangular shape with fillets of a radius of 5 mm at four corners, FIG. 13B shows a side view of the model TP1 in FIG. 13A, FIG. 13C shows a 6-6 sectional view of the model TP1 in FIG. 13A, FIG. 13D shows the model TP17 in which the opening 11f has an elliptical shape, FIG. 13E shows the model TP16 in which the opening 11f has an ellipsoidal shape (rectangular shape with round corners or oblong shape), FIG. 13F shows the model TP12 in which the opening 11f has a long rectangular shape with fillets of a radius of 5 mm at four corners, and FIG. 13G shows the model TP15 in which the opening 11f has a circular shape.

Here, a full length of the opening 11f along the direction of the extending axis L, i.e., the height of the opening 11f is hL (hereinafter referred to simply as "hL"), and a body section 1e-side edge of the opening 11f, i.e., the position where hL=0 mm (at an upper surface 110A of a bottom portion 110) is a reference o, and a width of the opening 11f at the reference o is wB.

(Position of w1)

The measuring position of the width w1 corresponding to width W1 of the enlarged portion defined above in each Example of the model TP will be described below.

The width W1 of the enlarged portion 11h is defined as a width which is measured at the location nearest to a distal edge of the enlarged portion 11h where the edge of the opening 11f constitutes the outer surface of the arm portion 1a. By applying this definition to each model TP in Examples, the width w1 is unambiguously measured at the position h3 where h3=hL/2 in TP15 (FIG. 13E) and TP17 (FIG. 13D) in which the opening 11f has an elliptical shape and a circular shape, respectively. On the other hand, the width w1 cannot be unambiguously measured at a specific position in TP1 (FIG. 13A) in which the opening 11f has a short rectangular shape, TP16 (FIG. 13E) in which the opening 11f has an ellipsoidal shape (rectangular shape with round corners or oblong shape), and TP12 (FIG. 13F) in which the opening 11f has a long rectangular shape, since the side along the extending axis L of the opening 11f has a linear part so that the measuring position of the width W1 can be measured at an arbitrary position of this linear part. Similarly, the width w1 cannot be unambiguously measured at a specific position in TP10, TP9, TP8, TP7, TP11, and TP18 in each of which the side along the extending axis L of the opening 11f shown in FIG. 11 has a straight line. Therefore, in these Examples where the measuring position of the width W1 cannot be unambiguously determined, the measuring position h3 of the width w1 is determined as the position h3=hL/2. The measuring position of this width w1 is an example of the locations nearest to the distal edge of the enlarged portion where the edge of the opening constitutes the outer surface of the arm portion.

Next, referring to FIG. 13A, w(2-1) corresponding to W(2-1), w2 corresponding to W2, w(3-1) corresponding to W(3-1), and the measuring position of w3 corresponding to W3 in each Example of the model TP will be described below.

The following explanation is also applicable to the models TP of Examples as shown in FIG. 13B to FIG. 13E, and the models TP of Examples which are not shown in FIGS. 13A to 13E.

(w(2-1) and Measuring Position of w2)

According to the aforementioned definition of the second width W2, in model TP, the measuring position corresponding to the middle position H2 is h2(=h3/2) as shown in FIG. 13A. When the position of the body section 1e-side edge is the reference o, a width w2 should be a width of the enlarged portion at any location parallel to the width w1 in a region extending from the reference o to the position h2. However, in the models TP, the width w2 is a width of the enlarged portion 11h which is measured at the position h1 which is shifted from the reference o toward the position h2 by 5 mm. Also, a width measured at the position h2 and a width measured at the reference o are used as w(24) and wB, respectively.

The measuring position h1 (i.e. 5 mm from the reference o) of this width w2 is an example of the measuring positions of the second width measured near the body section according to the aforementioned definition of the second width W2. As long as it complies with the definition of the width W2, it is desirable to determine the measuring position h1 in consideration of the position where stress concentration tends to occur. For example, the measuring position h1 may be a position of an inflection point on a circumference of the opening 11f. The measuring position h1 may be a position distant by e.g. 5 mm from the reference o which is the measuring position of the width wB.

(w(3-1) and Measuring Position of w3)

Similarly, in the model TP, a position corresponding to the middle position H4 is h4 (=(h3+hL)/2) according to the aforementioned definition of w3 as shown in FIG. 13A. A width w3 should be a width of the enlarged portion at any location parallel to the width w1 in a region extending from the position h4 to the position hL. However, in the models TP, the width w3 is a width of the enlarged portion 11h which is measured at the position hL. Also, the width of the position h4 is calculated as w(3-1).

The measuring position hL of the width w3 is an example of measuring positions according to the aforementioned definition of the third width W3 measured near the connecting portion.

It should be noted that a relationship o<h1<h2<h3<h4<hL is established in the aforementioned explanation.

Next, models in the comparative examples will be described below. The model TP5 in comparative example has a configuration that a front side part of the peripheral wall 11e is not provided in the first portion 11c and the enlarged portion 11h is not provided in the second portion 11d in the model TP shown in FIG. 9. Therefore, model TP5 of comparative example is the model TP having the smallest weight among all the models TP. In contrast, model TP6 of comparative example has a configuration that the opening 11f is not provided in the model TP shown in FIG. 9. Therefore, the model TP6 of comparative example is the model TP having the largest weight among all the models TP.

The shape and the test conditions which are common to all the models TP are described above. Here, the influence of the shape and dimensions of the opening 11f on the maximum principal stress and weight are studied from the first, second and third viewpoints.

(The First Viewpoint)

The first viewpoint is to study the relationship between the thickness t1 of the side portion 11k and the width w1 of the enlarged portion 11h when the height hL of the opening 11f is constant (70 mm) but the maximum value x (hereinafter referred to as merely "x"), i.e., the width of the opening 11f is varied.

FIG. 14 is a table showing relations between respective parameters and the maximum principal stress and weight from the first viewpoint. Specifically, FIG. 14 shows the parameters such as x, hL, area ratio of opening (opening area ratio), enlarged portion dimensions ratio (w1/t1) of the opening 11f, the weight, the value of maximum principal stress (translation) when the external force F of translation is input, and the value of maximum principal stress (rotation) when the external force M of rotation is input. It should be noted that the weight, the maximum principal stress (translation), and the maximum principal stress (rotation) may be called collectively as "measured values" (It is also applicable to the second viewpoint and the third viewpoint to be described later).

Further, in order to show the difference between the TP in Examples and TP in comparative example clearly, the maximum principal stress (translation) and the maximum principal stress (rotation) are shown together with the maximum principal stress index (translation) and the maximum principal stress index (rotation) the values of which are converted based on the values of maximum principal stress (translation) and the maximum principal stress (rotation) in TP6 in comparative example being 1.00, respectively, as a reference.

Further, the weight is shown together with the weight the value of which is converted based on the value of the weight in TP5 in comparative example being 1.00, respectively, as a reference.

It should be noted that the weight index, the maximum principal stress index (translation), and the maximum principal stress index (rotation) may be called collectively as "index values" (It is also applicable to the second viewpoint and the third viewpoint to be described later).

In FIG. 14, the "area ratio of opening" (i.e. opening area ratio) means a percentage of an area of the opening 11f to an area of hatched regions in the front view of the peripheral wall 11e and the peripheral walls 11g in FIG. 13A (i.e., the product of a length between center positions of the peripheral walls 11g and a height K of the arm portion 1a) (It is also applicable to the second viewpoint).

In FIG. 14, "The enlarged portion dimensions ratio" (i.e. enlarged portion width/thickness ratio) means a proportion of the center width w1 of the enlarged portion 11h to the thickness t1 of the side portion 11k (hereinafter also referred to as "w1/t1") in FIG. 14.

In FIG. 14, "the weight" means the weight of the arm portion 1a and the connecting portion 11a that are made of spheroidal graphite cast iron equivalent (specific gravity of 7.15) (It is also applicable to FIG. 16).

In FIG. 14, the "maximum principal stress (translation)" and the "maximum principal stress (rotation)" respectively mean the maximum principal stress values (unit: MPa) when the external forces F and M are applied along the directions described in FIG. 12A and FIG. 12B to the models made of the spheroidal graphite cast iron equivalent (Young's modulus of 170 GPa) (It is also applicable to FIG. 16 and FIG. 18).

Next, the values of the respective parameters, measured values and index values will be described below for each model TP.

(TP1)

For Example TP1 (x=45 mm, w1=20 mm, w1/t1=4.0, and the opening area ratio=30.3%), the evaluation results were: weight=1.759 kg, weight index=0.90, maximum principal stress (translation)=168 MPa, maximum principal stress index (translation)=0.44, maximum principal stress (rotation)=608 MPa, maximum principal stress index (rotation)=0.58.

(TP10)

For Example TP10 (x=25 mm, w1=30 mm, w1/t1=6.0, and opening area ratio=13.6%), the evaluation results were: weight=1.809 kg, weight index=0.92, maximum principal stress (translation)=135 MPa, maximum principal stress index (translation)=0.35, maximum principal stress (rotation)=390 MPa, and maximum principal stress index (rotation)=0.37.

(TP9)

For Example TP9 (x=55 mm, w1=15 mm, w1/t1=3.0, opening area ratio=38.6%), the evaluation results were: weight=1.735 kg, weight index=0.89, maximum principal stress (translation)=200 MPa, maximum principal stress index (translation)=0.52, maximum principal stress (rotation)=775 MPa, and maximum principal stress index (rotation)=0.74.

(TP8)

For Example TP8 (x=35 mm, w1=25 mm, w1/t1=5.0, opening area ratio=21.9%), the evaluation results were: weight=1.784 kg, weight index=0.91, maximum principal stress (translation)=150 MPa, maximum principal stress index (translation)=0.39, maximum principal stress (rotation)=499 MPa, and maximum principal stress index (rotation)=0.48.

(TP5)

For the comparative example TP5, the evaluation results were: weight=1.545 kg, weight index=0.79, maximum principal stress (translation)=385 MPa, maximum principal stress index (translation)=1.00, maximum principal stress (rotation)=1050 MPa, and maximum principal stress index (rotation)=1.00.

(TP6)

For the comparative example TP6, the evaluation results is weight=1.959 kg, weight index=1.00, maximum principal stress (translation)=100 MPa, maximum principal stress index (translation)=0.26, maximum principal stress (rotation)=160 MPa, and maximum principal stress index (rotation)=0.15.

Figure 15A:
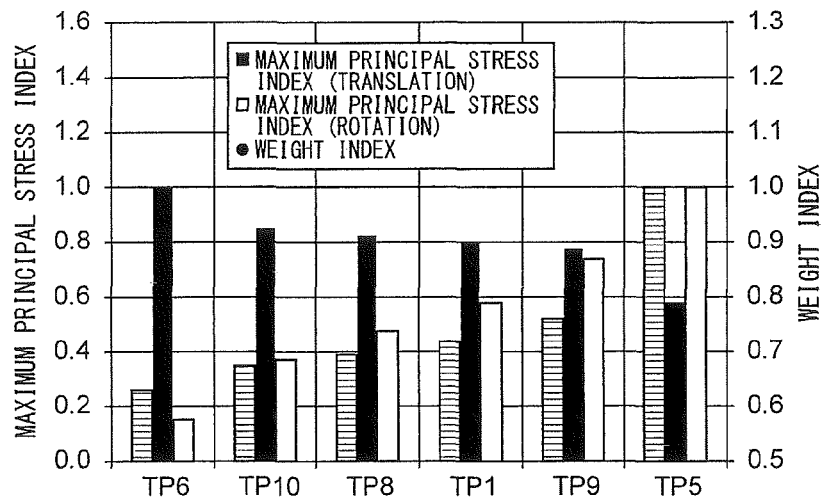
FIG. 15A shows graphs showing the evaluation results of the models from the first viewpoint.
Figure 15B:
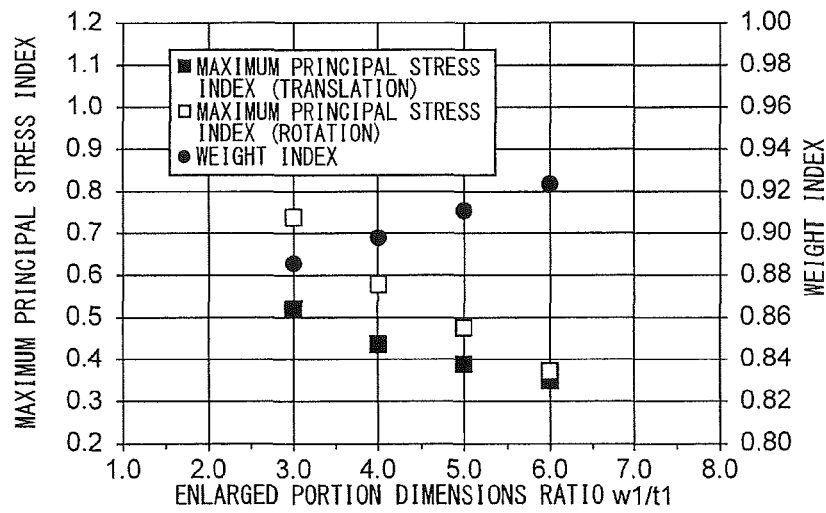
FIG. 15B shows graphs showing the evaluation results of the models from the first viewpoint.
Figure 15C:
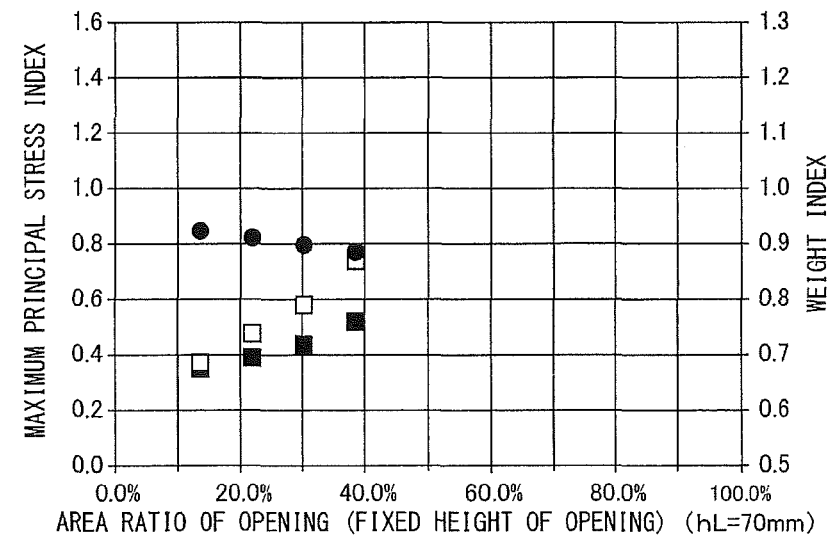
FIG. 15C shows graphs showing the evaluation results of the models from the first viewpoint.

FIG. 15A to FIG. 15C show graphs showing evaluation results from the first viewpoint as shown in FIG. 14.

FIG. 15A shows graphs representing the index value of each model TP. The weight index values of TP10, TP8, TP1, and TP9 fall between the value of comparative example TP6 and the value of comparative example TP5.

Both the values of the maximum principal stress index (translation) and the maximum principal stress index (rotation) of TP10, TP8, TP1, and TP9 fall between the value of the comparative example TP6 and the values of the comparative example TP5.

Thus, in each of Example TP10, TP8, TP1, and TP9, the maximum principal stress was suppressed to be smaller than the comparative example TP5, and the weight was smaller than comparative example TP6.

In other words, it is confirmed that Example TP10, TP8, TP1, and TP9 are superior in the maximum principal stress and the weight, namely, the balance between the strength security and the weight reduction, to the comparative example TP5 and TP6.

FIG. 15B shows graphs representing the relationship between the enlarged portion dimensions ratio (w1/t1) and the index value in each Example TP.

As clearly understood from FIG. 15B, it is confirmed that, in accordance with the increase in the enlarged portion dimensions ratio, both the maximum principal stress index (translation) and the maximum principal stress index (rotation) decrease while the weight index increases. On one hand, when the enlarged portion dimensions ratio is 2.0 or more, the maximum principal stress index (rotation) is 0.85 or less. On the other hand, when the enlarged portion dimensions ratio is 7.0 or less, the maximum principal stress index (rotation) is 0.95 or less. That is, the enlarged portion dimensions ratio is preferably from 2.0 to 7.0, since both the maximum principal stress and the weight can be suppressed relatively small and so that the deformation and damage of the arm portion can be further suppressed and that the degree of the weight reduction can be improved.

FIG. 15C shows graphs representing relationship between the opening area ratio and the index value of each Example TP.

As clearly understood from FIG. 15C, in accordance with the increase of the opening area ratio within a range from 10% to 40%, the weight index decreases while both the maximum principal stress-index (translation) and the maximum principal stress index (rotation) increase.

(The Second Viewpoint)

The second viewpoint is to study the effect of varying the opening area ratio by varying a proportion of the height hL of the opening 11f to the height K (120 mm) of the arm portion 1a (hereinafter referred to as "opening height ratio" or "hL/K" by keeping the maximum value x of the width of the rectangular opening 11f constant (45 mm) while changing the height hL of the opening 11f.

Next, the values of the respective parameters, measured values and index values will be described below for each model TP. The descriptions of the comparative examples TP5 and TP6 are omitted since they are already described in the explanation of the first viewpoint.

(TP1)

For Example TP1 (hL=70 mm, hL/K=0.58, and opening area ratio=30.3%), the evaluation results were: weight=1.759 kg, weight index=0.90, maximum principal stress (translation)=168 MPa, maximum principal stress index (translation)=0.44, maximum principal stress (rotation)=608 MPa, and maximum principal stress index (rotation)=0.58.

(TP7)

For Example TP7 (hL=35 mm, hL/K=0.29, and opening area ratio=13.2%), the evaluation results were: weight=1.815 kg, weight index=0.93, maximum principal stress (translation)=236 MPa, maximum principal stress index (translation)=0.61, maximum principal stress (rotation)=428 MPa, and maximum principal stress index (rotation)=0.41.

(TP11)

For Example TP11 (hL=45 mm, hL/K=0.38, and opening area ratio=18.1%), the evaluation results were weight=1.799 kg, weight index=0.92, maximum principal stress (translation)=207 MPa, maximum principal stress index (translation)=0.54, maximum principal stress (rotation)=485 MPa, and maximum principal stress index (rotation)=0.46.

(TP18)

For Example TP18 (hL=100 mm, hL/K=0.83, opening area ratio=44.8%), the evaluation results were: weight=1.711 kg, weight index=0.87, maximum principal stress (translation)=173 MPa, maximum principal stress index (translation)=0.45, maximum principal stress (rotation)=623 MPa, and maximum principal stress index (rotation)=0.59.

Figure 17A:
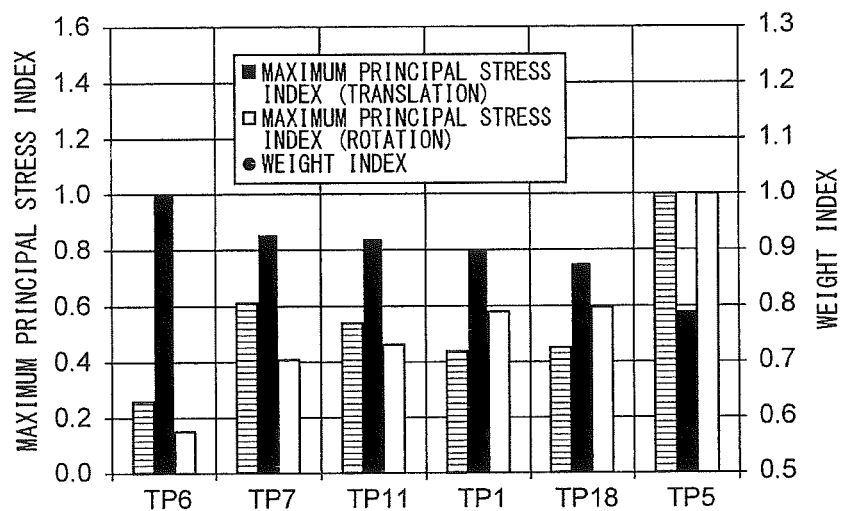
FIG. 17A shows graphs showing the evaluation results of the models from the second viewpoint.
Figure 17B:
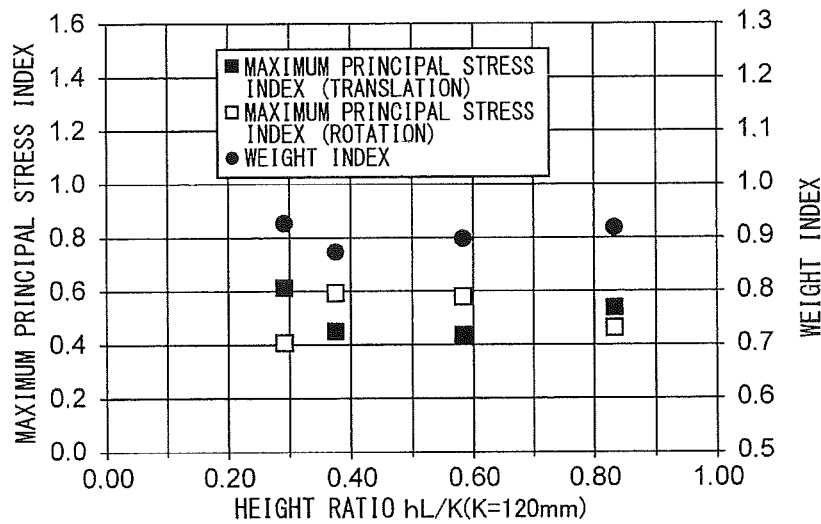
FIG. 17B shows graphs showing the evaluation results of the models from the second viewpoint.
Figure 17C:
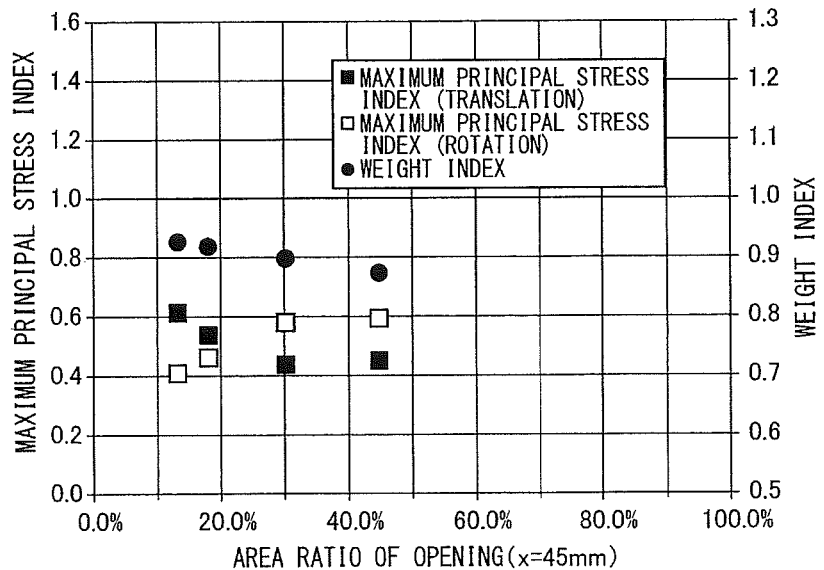
FIG. 17C shows graphs showing the evaluation results of the models from the second viewpoint.

FIG. 17A to FIG. 17C show graphs showing evaluation results from the second viewpoint as shown in FIG. 16.

FIG. 17A shows graphs representing the index value of each model TP. The weight index values of TP1, TP7, TP11, and TP18 fall between the value of comparative example TP6 and the value of comparative example TP5.

Both the values of the maximum principal stress index (translation) and the maximum principal stress index (rotation) of TP1, TP7, TP11, and TP18 fall between the value of the comparative example TP6 and the values of the comparative example TP5.

Thus, in each of Example TP1, TP7, TP11, and TP18, the maximum principal stress was suppressed to be smaller than the comparative example TP5, and the weight was smaller than comparative example TP6.

In other words, it is confirmed that Example TP1, TP7, TP11, and TP18 are superior in the maximum principal stress and the weight, namely, the balance between the strength security and the weight reduction, to the comparative example TP5 and TP6, so that the deformation and damage of the arm portion can be further suppressed and that the degree of the weight reduction can be improved.

FIG. 17B shows graphs representing relations between the opening height ratio (hL/K) and the index value of each Example TP.

As clearly understood from FIG. 17B, when hL/K is from 0.29 to 0.83, both the maximum principal stress index (rotation) and the maximum principal stress index (translation) are suppressed to be 0.6 or less, and the weight index is also suppressed to be 0.95 or less. It is confirmed that the deformation and damage of the arm portion can be further suppressed and that the degree of the weight reduction can be improved.

FIG. 17C shows graphs representing relations between the opening area ratio and the index value of each Example TP.

As clearly understood from FIG. 17C, when the opening area ratio is 10% or more, the weight index is 0.95 or less, namely, the weight reduction of 5% or more can be achieved and the maximum principal stress index (translation) is 0.7 or less. Further, when the opening area ratio is up to 30%, the maximum principal stress index (translation) is rather reduced to 0.44. Even though the opening area ratio increases to 45%, the maximum principal stress index (translation) is 0.45, namely, hardly increases.

On the other hand, when the opening area ratio is 30%, the maximum principal stress index (rotation) increases up to 0.58. Even though the opening area ratio increases up to 45%, the maximum principal stress index (rotation) is 0.59, namely, hardly increases and not greater than 0.6.

Accordingly, it is confirmed that the opening area ratio is preferably between 10 and 80% in order to achieve the weight index being 0.95 or less and both the maximum principal stress index (translation) and the maximum principal stress index (rotation) being 0.7 or less. When the opening area ratio is less than 10%, a percentage of the weight of the connecting portion 11a and the arm portion 1a to the of these portions of the model having no opening 11f exceeds 95%, namely, the weight reduction percentage remains less than 5%. Therefore, it is not preferable. On the other hand, when the opening area ratio exceeds 80%, the percentage of the maximum principal stress index (translation) or maximum principal stress index (rotation) to that of the model having no enlarged portion 11h exceeds 85%, namely, the stress reduction effect remains less than 15%. Therefore, it is not preferable. The opening area ratio is more preferably from 10 to 60%, even preferably from 15 to 60%, and most preferably from 20 to 60%.

From the comparison between FIG. 17C showing graphs representing the results in which x=45 mm is fixed and FIG. 15C showing graphs representing the result in which hL=70 mm is fixed from the first viewpoint, it is confirmed that the degree of the increase in the maximum principal stress index (translation) and the maximum principal stress index (rotation) in accordance with the increase of the opening area ratio in FIG. 17C is suppressed to be smaller than that in FIG. 15C. From the first viewpoint, it means that the increase of the opening area ratio by the increase of the maximum value x of the width of the rectangular opening 11f can increase the enlarged portion dimensions ratio w1/t1 at the same time. In contrast, from the second viewpoint, the opening area ratio is changed while the enlarged portion dimensions ratio w1/t1 is kept constant. Thus, it is confirmed that, in the case of reducing the weight by increasing the opening area ratio, it is preferable to increase the height of the opening, i.e., increasing the opening height ratio while maintaining the enlarged portion dimensions ratio w1/t1 as large as possible rather than reducing the enlarged portion dimensions ratio win since both the increase of the maximum principal stress (translation) and the increase of the maximum principal stress (rotation) can be suppressed.

(The Third Viewpoint)

The third viewpoint is to study the relationship and effect of w2 and w3 to w1 with keeping the area of the opening 11f constant while changing the shape of the opening 11f.

FIG. 18 shows the values of the respective parameters, measured values and index values from the third viewpoint.

Specifically, the parameters are: x and hL of the opening 11f, widths w3, w(3-1), w1, w (2-1), w2, and wB of the enlarged portion 11h, width proportions w3/w1, w(3-1)/w1, w(2-1)/w1, w2/w1, and wB/w1 of the enlarged portion 11h. Here, the opening area ratio of the opening 11f is 18.1% which is the same as the opening area ratio in TP11 shown in the description of the second viewpoint.

Next, the values of the respective parameters, measured values and index values will be described below for each model TP. The descriptions of the comparative examples TP5 and TP6 are omitted since they are already described in the explanation of the first viewpoint.

(TP11)

For Example TP11 with the opening 11f having a regular square shape in which fillets with a radius of 5 mm are provided at four corners (x=45 mm, hL=45 mm, w3=25 mm, w(3-1)=25 mm, w1=20 mm, w(2-1)=20 mm, w2=20 mm, wB=25 mm, w1/t1=4.00, w3/w1=1.25, w(3-1)/w1=1.25, w(2-1)/w1=1.00, w2/w1=1.00, wB/w1=1.25), the evaluation results were: weight=1.799 kg, weight index=0.92, maximum principal stress (translation)=207 MPa, maximum principal stress index (translation)=0.54, maximum principal stress (rotation)=485 MPa, maximum principal stress index (rotation)=0.46.

(TP17)

For Example TP17 with the opening 11f having an elliptical shape (x=36 mm, hL=72 mm, w3=42.5 mm, w(3-1)=27.0 mm, w1=24.5 mm, w(2-1)=27.0 mm, w2=33.35 mm, wB=42.5 mm, w1/t1=4.90, w3/w1=1.73, w(3-1)/w1=1.10, w(2-1)/w1=1.10, w2/w1=1.36, wB/w1=1.73, weight=1.798 kg, weight index=0.92, maximum principal stress (translation)=125 MPa, maximum principal stress index (translation)=0.32, maximum principal stress (rotation)=222 MPa, and maximum principal stress index (rotation)=0.21.

(TP16)

For Example TP16 with the opening 11f having an ellipsoidal shape (rectangular shape with round corners in which each short side has a semi-circular shape) (x=225 mm, hL=94.5 mm, w3=42.5 mm, w(3-1)=31.25 mm, w1=31.25 mm, w(2-1)=31.25 mm, w2=33.00 mm, wB=42.5 mm, w1/t1=6.25, w3/w1=1.36, w(3-1)/w1=1.00, w(2-1)/w1=1.00, w2/w1=1.06, and wB/w1=1.36), the evaluation results were weight=1.799 kg, weight index=0.92, maximum principal stress (translation)=117 MPa, maximum principal stress index (translation)=0.30, maximum principal stress (rotation)=311 MPa, and maximum principal stress index (rotation)=0.30.

(TP12)

For Example TP12 with the opening 11f having a rectangular shape in which fillets with a radius of 5 mm are provided at four corners (x=22.5 mm, hL=90 mm, w3=36.25 mm, w(3-1)=31.25 mm, w1=31.25 mm, w (2-1)=31.25 mm, w2=31.25 mm, wB=36.25 mm, w1/t1=6.25, w3/w1=1.16, w(3-1)/w1=1.00, w(2-1)/w1=1.00, w2/w1=1.00, wB/w1=1.16), the evaluation results were: weight=1.799 kg, weight index=0.92, maximum principal stress (translation)= 137 MPa, maximum principal stress index (translation)= 0.36, maximum principal stress (rotation)=424 MPa, and maximum principal stress index (rotation)=0.40.

(TP15)

For Example TP15 with the opening 11f having a circular shape (x=50.8 mm, hL=50.8 mm, w3=42.5 mm, w(3-1)= 20.73 mm, w1=17.10 mm, w(2-1)=20.73 mm, w2=27.37 mm, wB=42.50 mm, w1/t1=3.42, w3/w1=2.49, w(3-1)/w1=1.21, w(2-1)/w1=1.21, w2/w1=1.60, wB/w1=2.49), the evaluation results were: weight=1.799 kg, weight index=0.92, maximum principal stress (translation)=202 MPa, maximum principal stress index (translation)=0.52, maximum principal stress (rotation)=280 MPa, and maximum principal stress index (rotation)=0.27.

FIGS. 19A to 19D show the evaluation results to the models from the third viewpoint.

Figure 19A:
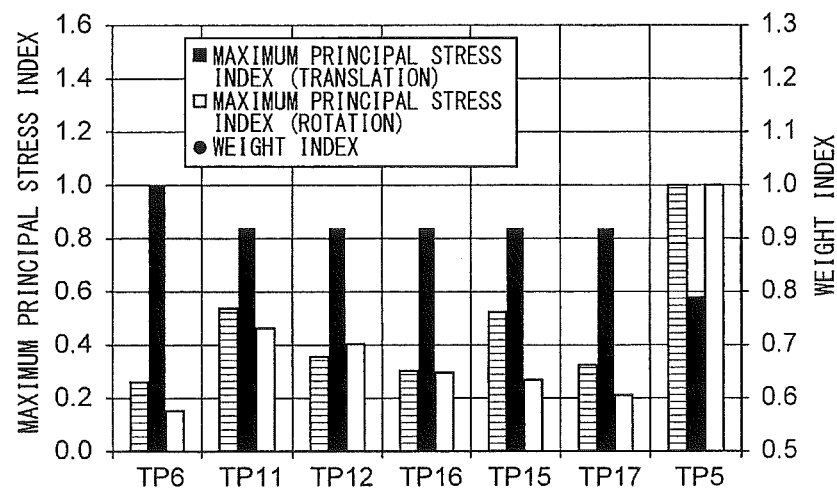
FIG. 19A shows graphs showing the evaluation results of the models from the third viewpoint.

FIG. 19A shows graphs representing the index values of each model TP.

In each of TP11, TP12, TP16, TP15, and TP17, both the maximum principal stress index (translation) and the maximum principal stress index (rotation) are smaller than those in TP5, and the weight index is smaller than that in TP6. That is, TP11, TP12, TP16, TP15, and TP17 are superior in the balance between the maximum principal stress and the weight, namely, the balance between the strength security and the weight reduction, to TP5 and TP6.

As to the comparison in maximum principal stress index (rotation), with respect to TP11, the value is reduced in the order of TP12, TP16, TP15, and TP17. Particularly, the value of TP17 with the opening 11f having the ellipsoidal shape (rectangular shape with round corners in which short side is semi-circular), the value of TP16 with the opening 11f having an elliptical shape, and the value of TP15 with the opening 11f with a circular shape are small so that these shapes are preferable. That is, it is preferable that the shape of the opening 11f is rounded or curved as compared with the rectangular shape such as TP11 and TP12. In addition, as a result of comparison in maximum principal stress index (translation), it is confirmed that the ellipsoidal (rectangular shape with round corners or oblong) and elliptical shapes of the opening 11f are more preferable as in TP16 and TP17 are more preferable than the circular shape of the opening 11f in TP15.

Figure 19B:
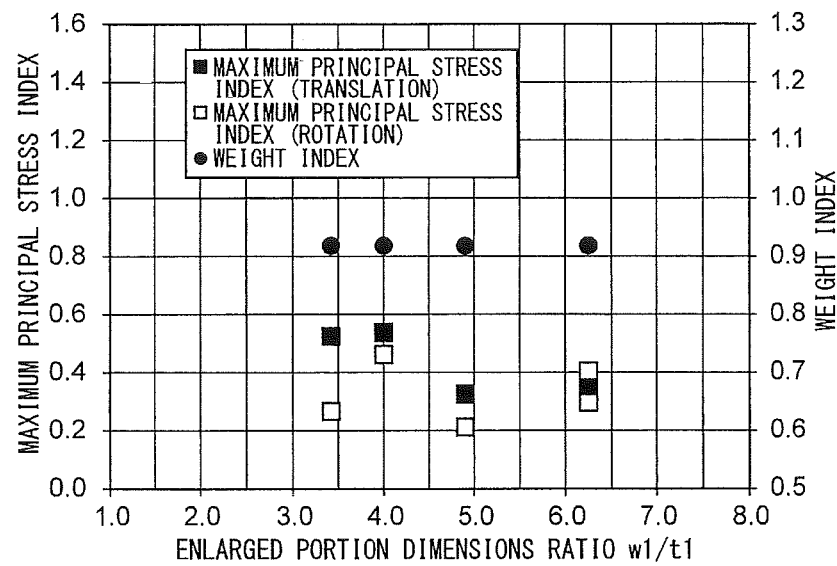
FIG. 19B shows graphs showing the evaluation results of the models from the third viewpoint.

FIG. 19B shows graphs representing the relationship between the enlarged portion dimensions ratio and the index value.

The weight index is 0.92 in all of TP11, TP12, TP16, TP15, and TP17, since the area of the opening 11f is the same. The maximum principal stress index (translation) and the maximum principal stress index (rotation) is 0.6 or less in all of TP11, TP12, TP16, TP15, and TP17 within the range from 3.42 to 6.25 which is the value of w1/t1 of these Examples.

Here, FIG. 19B is compared with FIG. 15B in which the opening 11f has the rectangular shape from the first viewpoint.

In FIG. 15B, when w1/t1 is 3.5 or less, the value of the maximum principal stress index (rotation) may exceed 0.6. In FIG. 19B, for example, when the opening 11h has a circular shape and w1/t1 is 3.42 as in TP15, the value of the maximum principal stress index (rotation) is 0.27. Thus, it is confirmed that the value of the maximum principal stress index (rotation) can be greatly suppressed in comparison with the maximum principal stress index (rotation) of the model having the same enlarged portion dimensions ratio as in FIG. 15B.

Thus, it is confirmed that it is preferable to change the shape of the opening 11h, thereby remarkably suppressing, in particular, the value of maximum principal stress index (rotation). More particularly, in TP17 in which w1/t1 is 4.90, the maximum principal stress index (translation) is 0.32, which is next to TP16 in which the maximum principal stress index (translation) is 0.30, and the maximum principal stress index (rotation) is 0.21 which is the smallest value. The maximum principal stress index (translation) and the maximum principal stress index (rotation) in TP17 are remarkably smaller than the maximum principal stress index (translation) of 0.39 and the maximum principal stress index (rotation) of 0.0.48 in TP8 (w1/t1=5.0, and weight index=0.91) having the same enlarged portion dimensions ratio in FIG. 15E.

Figure 19C:
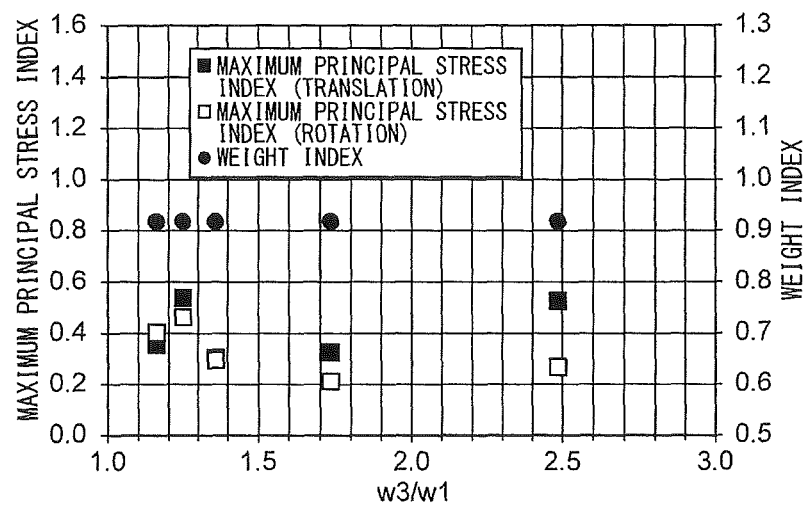
FIG. 19C shows graphs showing the evaluation results of the models from the third viewpoint.

FIG. 19C shows graphs representing the relationship between w3/w1 and the index value. It is confirmed that w3/w1 preferably is 1.1 or more but 2.6 or less, since both the maximum principal stress index (translation) and the maximum principal stress index (rotation) can be suppressed to be 0.6 or less.

Figure 19D:
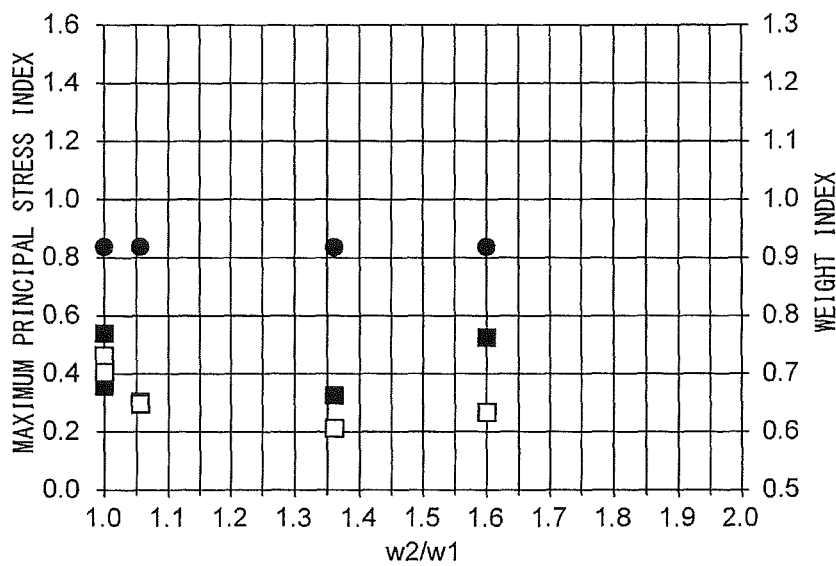
FIG. 19D shows graphs showing the evaluation results of the models from the third viewpoint.

FIG. 19D shows graphs representing the relationship between w2/w1 and the index value. It is confirmed that w2/w1 preferably is 1.1 or more but 1.7 or less, since both the maximum principal stress index (translation) and the maximum principal stress index (rotation) can be suppressed to be 0.6 or less.

As described above, from the third viewpoint, the model for suppressing the maximum principal stress index (translation) and the maximum principal stress index (rotation) at the best balance is TP17 with the opening 11f having an elliptical shape. The second best models are TP16 with the opening 11f having the ellipsoidal shape (rectangular shape with round corners in which short side is semi-circular or oblong shape) and TP16 with the opening 11f having a circular shape. Therefore, the shape of the opening 11f is preferably a round or curved shape than a rectangular shape, more preferably ellipsoidal shape (rectangular shape with round corners in which short side is semi-circular or oblong shape) rather than a circular shape, even preferably an elliptical shape. In particular, the opening 11f has an elliptical shape in which a length of the opening 11f along the extending axis L is between 1.2 and 3 times greater than a length of the opening 11f along a direction intersecting the extending axis L.

It should be noted that, in an application to a real vehicle steering knuckle, the arm portion 1a in the first exemplary embodiment curves along the extending axis L as shown in e.g. FIG. 1. The shape of the opening 11f in such a configuration viewed from the direction in which an area of the opening 11f becomes the maximum when the arm portion 1a is viewed perpendicularly to the extending axis L.

Also, due to restrictions in production or other limitations, the opening 11f may not have a simple elliptical shape. In particular, the body section 1e-side portion of the opening 11f may have a substantially rectangular shape, which is advantageous in easy formation of the hollow portion 11j and weight reduction. Also, the connecting portion 11a-side portion of the opening 11f may have a substantially parabolic shape.

Next, the measuring results of the maximum principal stress in the arm portion 1a when the load is applied thereto in a vehicle steering knuckle 1 having the enlarged portion shown in FIG. 1 as Example 1 and in a vehicle steering knuckle having no enlarged portion as a comparative example 1 will be described below. Here, in the comparative example 1, not only the enlarged portion 11h is absent but also the part corresponding to the first portion 11c in Example 1 is opened. The comparative example 1 has a configuration similar to Example 1 except the above differences. Further, both Example 1 and comparative example 1 are made of cast iron equivalent (specific gravity of 7.15, Young's modulus of 170 GPa).

(Enlarged Portion)

Table 1 shows parameters W1/t1, W3/W1 and W2/W1 in the arm portion 1a of the vehicle steering knuckle 1 (Example 1) having the enlarged portion shown in FIG. 5.

TABLE 1

| Parameters | Upper part of FIG. 5 (Y(−) side of FIG. 1) | Lower part of FIG. 5 (Y(+) side of FIG. 1) |
| --- | --- | --- |
| W1/t1 | 3.70 | 3.00 |
| W3/W1 | 1.80 | 2.15 |
| W2/W1 | 1.55 | 1.35 |

(Opening Area Ratio and Opening Height Ratio)

In Example 1, the opening 11f is provided. As to the shape of the opening 11f, the connection portion 11a-side portion with respect to the position W1 has a substantially parabolic shape and the body section 1e-side portion with respect to the position W1 has a substantially rectangular shape.

The "opening area ratio" is a value derived by dividing an "area of the opening 11f" by an "area of the opening 11f-side region (i.e. a region on a side of the opening 11f)" of the arm portion 1a.

Here, the "area of the opening 11f-side region" is calculated as an area of an inner region defined by a projected line (broken line of FIG. 1) of a center of the thickness of peripheral walls (11e, 11g) of the arm portion 1a on opening side wall (11e, 11h) of the arm portion 1a having the opening 11f and another projected line of a line intersecting the extending axis L and contacting the connecting portion 11a on the opening side walls (11e, 11h), when viewed from the direction, in which the area of the opening 11f becomes the maximum when the arm portion 1a is viewed perpendicularly to the extending axis L (hereinafter also referred to as "measuring direction").

Further, the "area of the opening 11f" is an area of the opening 11f when viewed from the measuring direction.

In Example 1, the "opening area ratio" of the opening 11f shown in FIG. 1 was 55.0%. The opening height ratio defined in the description as to the second viewpoint was 80%

(Test Condition)

Returning to FIG. 6, test condition will be described below.

A center Ps of the body section 1e was restricted in both Example 1 and the comparative example 1. At this time, the body section 1e was also restricted not to rotate around Z-axis. A load point Pf was distant from the center Ps by a length E which is 3 times longer than a length of the arm portion 1a. Because the load F3 is applied in Y-axis (−) direction (the front direction perpendicular to a sheet surface) and comprised of a component of a force twisting the arm portion 1a, the maximum principal stress by the load F3 may be referred to as "maximum principal stress (rotation)" hereinafter. The value of the load F3 was 4 kN.

Also, because load F4 is applied in Z-axis (−) direction and consisted of a component of force pressing the arm portion 1a, and the load F4 does not include a component of a force twisting the arm portion 1a, the maximum principal stress by the load F4 may be referred to as "maximum principal stress (translation)" hereinafter. The value of the load F4 was 4 kN.

(Maximum Principal Stress (Translation))

Figure 20B:
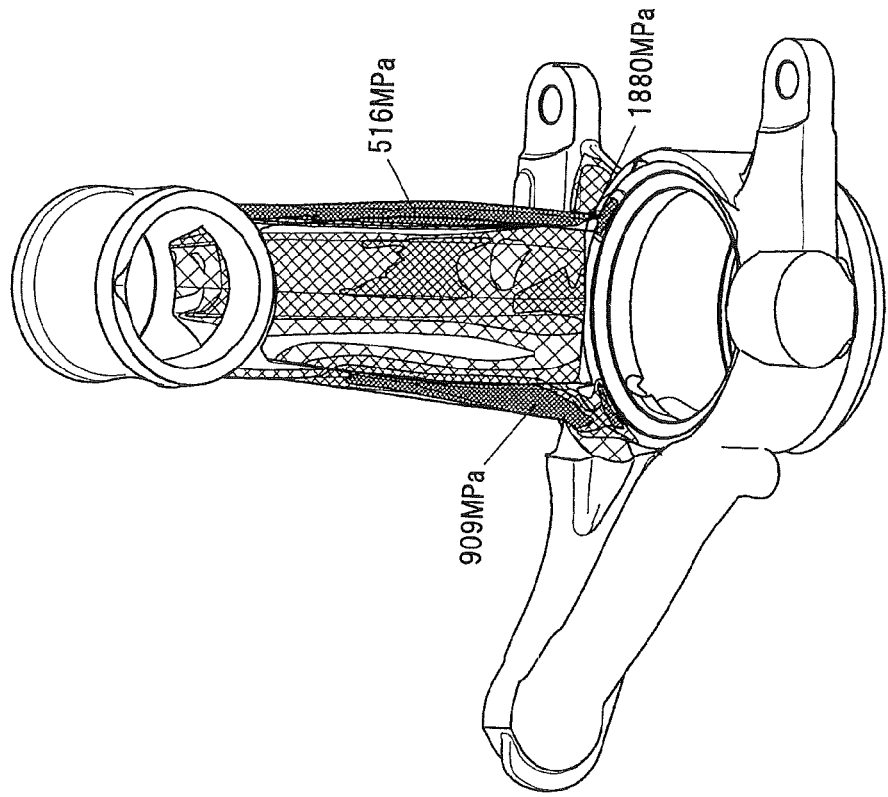
FIG. 20B is a chart showing the result of a measurement of the maximum principal stress (translation) in an arm portion of a vehicle steering knuckle (comparative example 1) having no enlarged portion in comparison with the vehicle steering knuckle shown in FIG. 1.
Figure 20A:
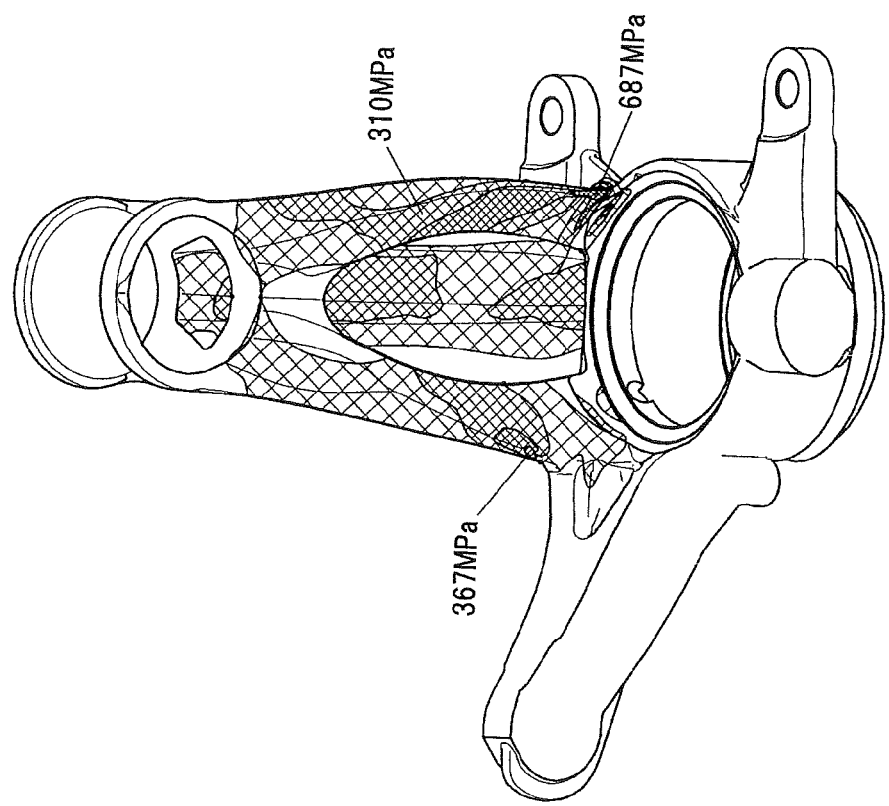
FIG. 20A is a chart showing the result of a measurement of the maximum principal stress (rotation) in an arm portion of a vehicle steering knuckle (Example 1) having an enlarged portion shown in FIG. 1.

At first, the result that the load F4 is input is shown. FIG. 20A is a chart showing the measurement results of the maximum principal stress (translation) in the arm portion 1a in Example 1. The shape of the opening 11f in Example 1 is a shape which is close to the elliptical shape of the opening in model TP17 as described above from the third viewpoint. On the other hand, FIG. 20B is a chart showing the measurement results of the maximum principal stress (translation) of the comparative example 1 having no enlarged portion 11h as compared to the vehicle steering knuckle 1 as shown in FIG. 1, which corresponds to the model TP5 as described above from the first and second viewpoints.

In the comparative example 1 having no enlarged portion 11h, the maximum principal stress (translation) was 1880 MPa. On the other hand, in Example 1 having the enlarged portion 11h, the maximum principal stress (translation) was 687 MPa.

A ratio of the maximum principal stress index (translation) of Example 1 to that of the comparative example 1 is 0.37:1.00, i.e. the maximum principal stress index (translation) of Example 1 is reduced to be approximately 1/2.7 of the comparative example 1.

(Maximum Principal Stress (Rotation))

Figure 21A:
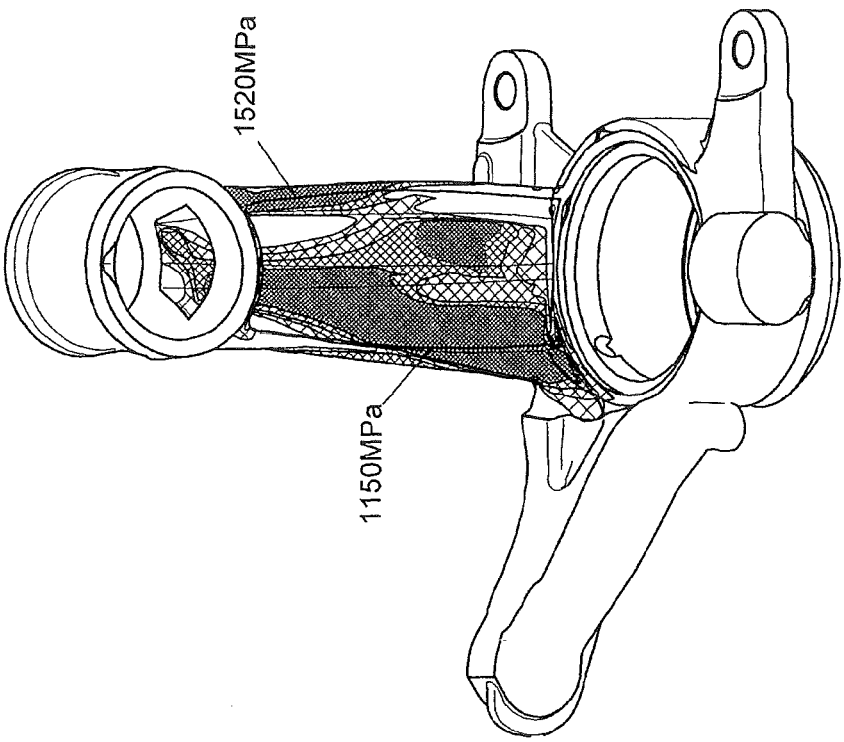
FIG. 21A is a chart showing the result of a measurement of the maximum principal stress (rotation) in the arm portion of Example 1.
Figure 21B:
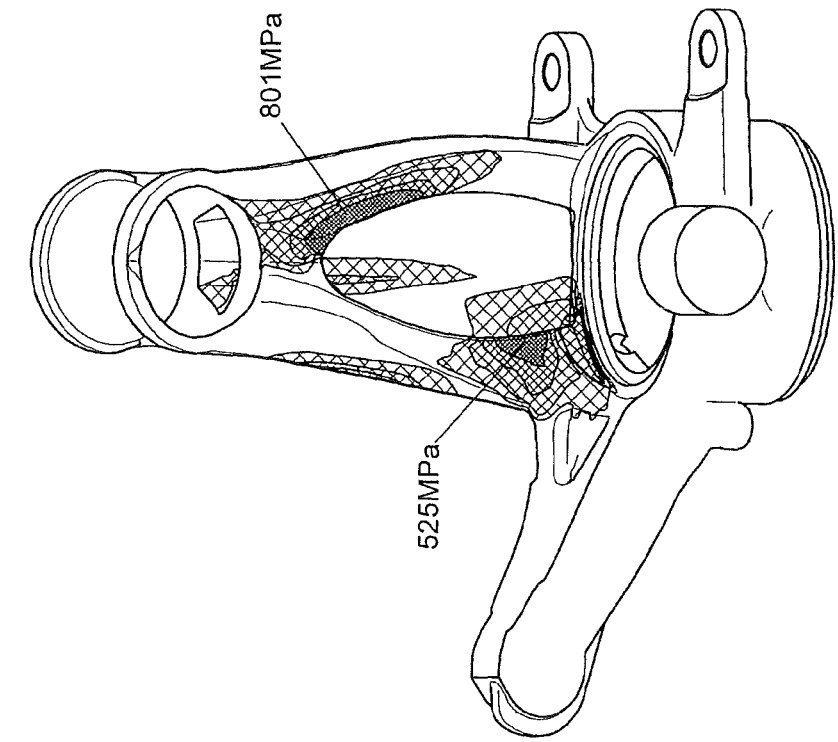
FIG. 21B is a chart showing the result of a measurement of the maximum principal stress (translation) in the arm portion of comparative example 1.

Then, the result that the load F3 is applied is shown. FIG. 21A is a chart showing the measurement results of the maximum principal stress (rotation) in the arm portion 1a in Example 1. FIG. 21B is a chart showing the measurement results of the maximum principal stress (rotation) of the comparative example 1.

In the comparative example 1 having no enlarged portion 11h, the maximum principal stress (rotation) was 1520 MPa. On the other hand, in Example 1 having the enlarged portion 11h, the maximum principal stress (rotation) was 801 MPa.

A ratio of the maximum principal stress index (rotation) of Example 1 to that of the comparative example 1 is 0.53:1.00, i.e. the maximum principal stress index (rotation) of Example 1 is reduced to be approximately 1/1.9 of the comparative example 1.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A vehicle steering knuckle, comprising:
   a body part to which an axle is attached;
   an arm portion including one end integrally connected with an outer periphery of the body part and spreading outwardly from the body part along an extending axis; and
   a connecting portion integrally connected with another end of the arm portion, the connecting portion being configured to be connected with a vehicle component, wherein the arm portion comprises:
- a first portion integrally connected with the connecting portion in a direction along the extending axis;
- a second portion interposed between the first portion and the body part; and
- a hollow portion configured to communicate with the first portion and the second portion, wherein the first portion includes a peripheral wall configured to enclose the extending axis, wherein the second portion includes a peripheral wall including an opening partially opened around the extending axis, and wherein, at a cross-section intersecting the extending axis, an end portion of the peripheral wall of the second portion on a side of the opening comprises an enlarged portion which is enlarged in width as compared with thicknesses of side portions adjacent to the end portion.

2. The vehicle steering knuckle according to claim 1, wherein the enlarged portion is located to intersect a direction of a force acting on the arm portion via the connecting portion.

3. The vehicle steering knuckle according to claim 1, wherein, at the cross-section intersecting the extending axis, the enlarged portion is provided at both sides of the opening.

4. The vehicle steering knuckle according to claim 1, wherein, in the direction along the extending axis, the enlarged portion is extending toward the first portion and integrated with the peripheral wall of the first portion.

5. The vehicle steering knuckle according to claim 4, wherein, in the direction along the extending axis, the enlarged portion is extending toward the body part and integrated with the body part.

6. The vehicle steering knuckle according to claim 5, wherein a width of the enlarged portion is increased from a center of the second portion toward the first portion or the body part along the extending axis.

7. The vehicle steering knuckle according to claim 6, wherein a width measured nearer to the body part of the end portion is between 1.1 and 1.7 times greater than a width at a center of the end portion, or wherein a width measured nearer to the connecting portion of the end portion is between 1.1 and 2.6 times greater than the width at a center of the end portion.

8. The vehicle steering knuckle according to claim 1, wherein an outer surface of the enlarged portion comprises two or more surfaces formed along the extending axis.

9. The vehicle steering knuckle according to claim 1, wherein a thickness of the enlarged portion is between 2.0 and 7.0 times greater than a thickness of the side portion.

10. The vehicle steering knuckle according to claim 1, wherein the opening has an elliptical shape in which a length of the opening along the extending axis is between 1.2 and 3 times greater than a length of the opening along a direction intersecting the extending axis.

11. The vehicle steering knuckle according to claim 1, wherein an area of the opening is between 10% and 80% of an area of a region on the side of the opening of the arm portion.

12. A steering knuckle for a vehicle to which an axle is attached, said steering knuckle comprising:
- a body part to which the axle is attached;
- an arm portion including one end integrally connected with an outer periphery of the body part and spreading outwardly from the body part along an extending axis; and
- a connecting portion integrally connected with another end of the arm portion, the connecting portion being configured to be connected with a vehicle component, wherein the arm portion comprises:
- a portion interposed between the connecting portion and the body part;
- an opening having the extending axis therethrough; and
- a hollow portion configured to communicate with the opening and the portion, wherein the portion includes a peripheral wall having a first length, and wherein, at a cross-section intersecting the extending axis, an end portion of the peripheral wall of the portion on a side of the opening comprises an enlarged portion which has a second length, the second length being greater than the first length.

13. The vehicle steering knuckle according to claim 12, wherein the second length is between 2.0 and 7.0 times greater than the first length.

14. The vehicle steering knuckle according to claim 12, wherein the opening has an elliptical shape in which a length of the opening along the extending axis is between 1.2 and 3 times greater than a length of the opening along a direction intersecting the extending axis.

15. The vehicle steering knuckle according to claim 12, wherein an area of the opening is between 10% and 80% of an area of a region on the side of the opening of the arm portion.

16. A steering knuckle for a vehicle to which an axle is attached, said steering knuckle comprising:
- a body part to which the axle is attached;
- an arm portion including one end integrally connected with an outer periphery of the body part and spreading outwardly from the body part along an extending axis; and
- a connecting portion integrally connected with another end of the arm portion, the connecting portion being configured to be connected with a vehicle component, wherein the arm portion comprises:
- an opening having the extending axis therethrough; and
- an end portion configured to surround the opening, a width of the end portion being defined from an edge of the opening to a distal edge of the end portion in a vehicle width direction, wherein a first width at a center of the end portion is less than a second width measured nearer to the connecting portion of the end portion, wherein the first width at the center of the end portion is less than a third width measured nearer to the body part, and wherein an area of the opening is between 10% and 80% of an area of a region on the side of the opening of the arm portion.

17. The vehicle steering knuckle according to claim 16, wherein the opening has an elliptical shape in which a length of the opening along the extending axis is between 1.2 and 3 times greater than a length of the opening along a direction intersecting the extending axis.

* * * * *